United States Patent
Sugano

(10) Patent No.: US 11,842,453 B2
(45) Date of Patent: Dec. 12, 2023

(54) INFORMATION PROCESSING DEVICE, INFORMATION PROCESSING METHOD, AND PROGRAM

(71) Applicant: SONY GROUP CORPORATION, Tokyo (JP)

(72) Inventor: Hisako Sugano, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 81 days.

(21) Appl. No.: 17/618,647

(22) PCT Filed: Jun. 19, 2020

(86) PCT No.: PCT/JP2020/024249
§ 371 (c)(1),
(2) Date: Dec. 13, 2021

(87) PCT Pub. No.: WO2020/262261
PCT Pub. Date: Dec. 30, 2020

(65) Prior Publication Data
US 2022/0358724 A1    Nov. 10, 2022

(30) Foreign Application Priority Data
Jun. 28, 2019 (JP) ................. 2019-121554

(51) Int. Cl.
*G06T 19/00* (2011.01)
*G06T 7/73* (2017.01)
(Continued)

(52) U.S. Cl.
CPC ............. *G06T 19/006* (2013.01); *G06T 7/73* (2017.01); *G06T 19/20* (2013.01); *G06V 40/176* (2022.01); *G06T 2219/2016* (2013.01)

(58) Field of Classification Search
None
See application file for complete search history.

(56) References Cited

U.S. PATENT DOCUMENTS 11,335,065 B2 * 5/2022 Berthomier ........... G06T 19/006
11,450,051 B2 * 9/2022 Assouline ............. G06T 15/205
(Continued)

FOREIGN PATENT DOCUMENTS

JP  2006-227838 A  8/2006
JP  2007-042055 A  2/2007
(Continued)

OTHER PUBLICATIONS

Dickson, B., "How eye tracking will enhance the AR and VR experience; TechTalks", Oct. 2, 2018, https://web.archive.org/web/20181002074638/https://bdtechtalks.com/2018/05/11/ar-vr-eye-tracking-foveated-rendering/. pp. 1-5. XP055934343.
(Continued)

*Primary Examiner* — Ryan M Gray
(74) *Attorney, Agent, or Firm* — Paratus Law Group, PLLC

(57) ABSTRACT

A subject feature detection unit (53) (detection unit) of a mobile terminal (80) (information processing device) detects a line-of-sight direction (E) (feature) of a subject (92) displayed simultaneously with a 3D model (90M) in a captured image (I). Then, the display control unit (54) (control unit) changes a line-of-sight direction (F) (display mode) of the 3D model (90M) so that the 3D model (90M) faces the camera (84) in accordance with the line-of-sight direction (E) of the subject (92) detected by the subject feature detection unit (53).

19 Claims, 27 Drawing Sheets

(51) Int. Cl.
*G06V 40/16* (2022.01)
*G06T 19/20* (2011.01)

(56) References Cited

U.S. PATENT DOCUMENTS

| | | | | |
|---|---|---|---|---|
| 2012/0075484 | A1* | 3/2012 | Kawamoto | G06T 19/006 348/207.1 |
| 2012/0195463 | A1* | 8/2012 | Shinkai | G06T 5/005 382/103 |
| 2015/0371447 | A1* | 12/2015 | Yasutake | G06T 19/006 345/633 |
| 2018/0335930 | A1* | 11/2018 | Scapel | G06V 20/20 |
| 2020/0027271 | A1* | 1/2020 | Guay | G06T 7/73 |
| 2020/0265234 | A1* | 8/2020 | Lee | G06V 20/64 |

FOREIGN PATENT DOCUMENTS

| | | |
|---|---|---|
| JP | 2012-160039 A | 8/2012 |
| JP | 2015-503141 A | 1/2015 |
| JP | 2017-056114 A | 3/2017 |
| JP | 2017-138912 A | 8/2017 |
| JP | 2017-138914 A | 8/2017 |
| WO | WO 2017/082076 A1 | 5/2017 |

OTHER PUBLICATIONS

Niswar Arthur et al: "Virtual try-on of eyeglasses using 3D model of the head", ACM 2012 Conference on Computer Supported Cooperative Work Companion, CSCW '12, ACM, USA, Dec. 11, 2011 (Dec. 11, 2011), pp. 435-438, XP058600235, DOI: 10.1145/2087756.2087838.

Zhang Boping: "Augmented reality virtual glasses try-on technology based on iOS platform", EURASIP Journal on Image and Video Processing, vol. 2018, No. 1, Dec. 1, 2018 (Dec. 1, 2018), XP055933609, DOI: 10.1186/m13640-018-0373-8.

* cited by examiner

FIG.8

| | BEFORE DRAWING DIRECTION IS CHANGED | AFTER DRAWING DIRECTION IS CHANGED |
|---|---|---|
| A | 90M — aloha! | 90N — aloha! DIRECTION IN WHICH CAMERA EXISTS |
| B | 90M — aloha! | 90N — aloha! DIRECTION IN WHICH CAMERA EXISTS |

FIG.22
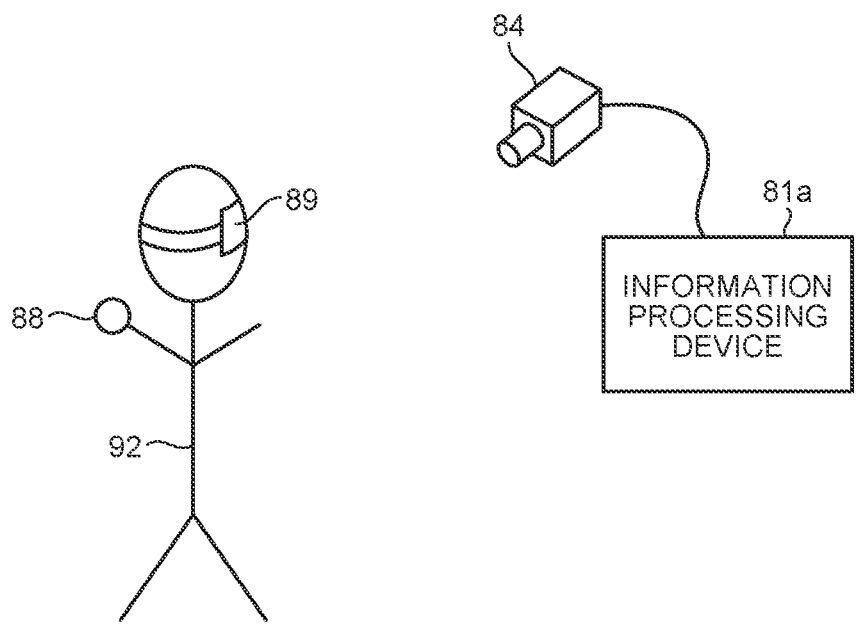
VIRTUAL IMAGE GENERATED BY INFORMATION PROCESSING DEVICE
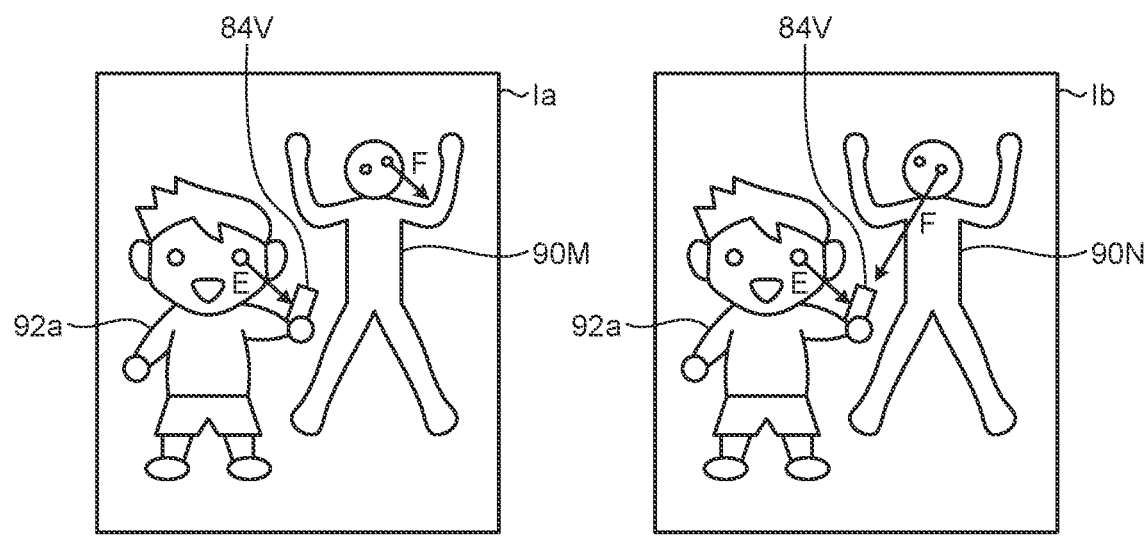

FIG.25
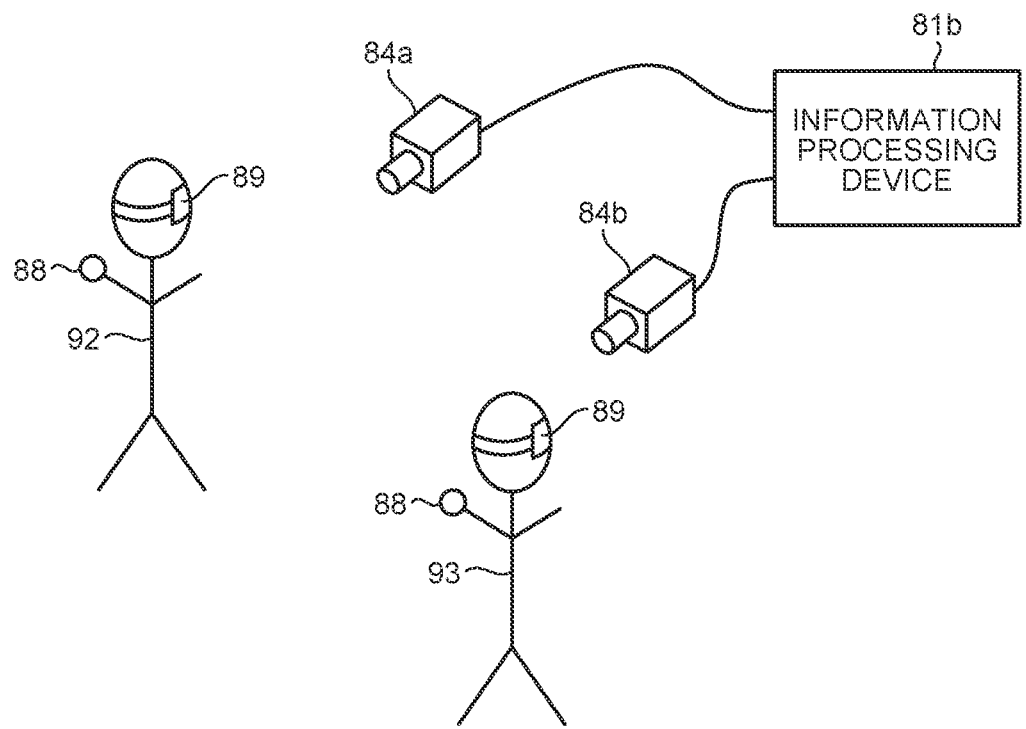
VIRTUAL IMAGE GENERATED BY INFORMATION PROCESSING DEVICE
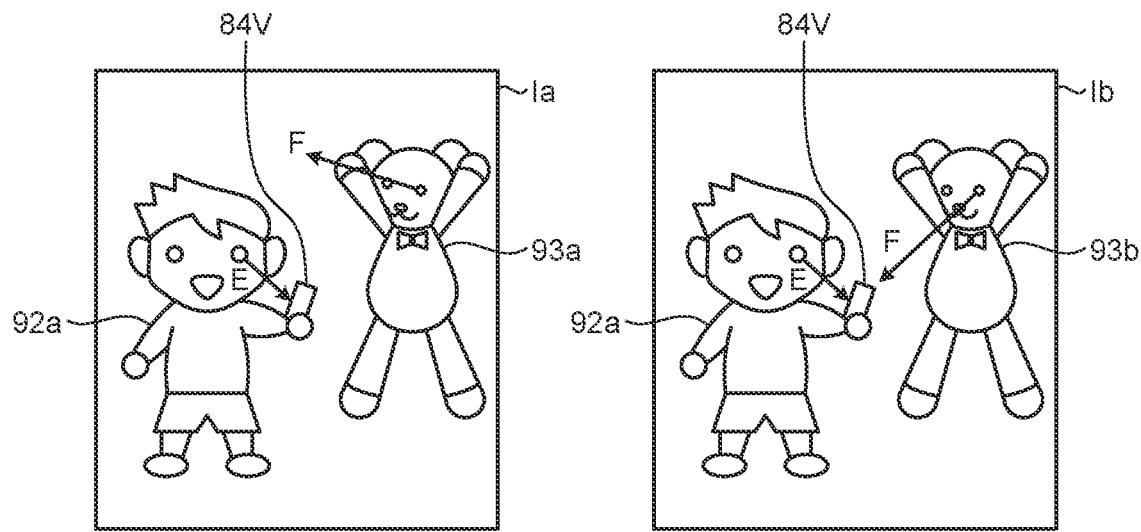

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/024249 (filed on Jun. 19, 2020) under 35 U.S.C. § 371, which claims priority to Japanese Patent Application No. 2019-121554 (filed on Jun. 28, 2019), which are all hereby incorporated by reference in their entirety.

FIELD

The present disclosure relates to an information processing device, an information processing method, and a program, and particularly relates to an information processing device, an information processing method, and a program capable of causing a 3D object to perform an interactive motion or reaction in response to a motion of an observer.

BACKGROUND

There has been conventionally proposed a method of generating a 3D object in a viewing space by using information obtained by sensing a real 3D space, for example, a multi-view video obtained by capturing images of a subject from different viewpoints, and generating a video (also referred to as a volumetric video) in which the object looks as if the object exists in the viewing space (e.g., Patent Literature 1).

CITATION LIST

Patent Literature

Patent Literature 1: WO 2017/082076 A

SUMMARY

Technical Problem

A video generated by the above method is a 3D video generated by using an actual video of a subject. Therefore, an observer who observes the 3D video can enjoy a sense of immersion and a sense of presence as if the subject is close to the observer.

However, it has not been possible to cause the generated 3D object to perform a motion or reaction in response to a motion or state of the observer. That is, it has not been possible that the 3D object performs an interactive motion or reaction with respect to the observer.

In view of this, the present disclosure proposes an information processing device, an information processing method, and a program capable of causing a 3D object displayed in a captured image including a subject who is an observer to perform an interactive motion or reaction with respect to the subject.

Solution to Problem

To solve the problems described above, an information processing device according to the present disclosure is an information processing device that includes: a control unit that controls a 3D model displayed in a captured image; and a detection unit that detects a feature of a subject displayed simultaneously with the 3D model in the captured image, wherein the control unit changes a display mode of the 3D model in accordance with the feature of the subject detected by the detection unit.

BRIEF DESCRIPTION OF DRAWINGS

FIG. 8 illustrates a method of changing a drawing direction of a 3D model.

FIG. 22 illustrates an overview of an information processing device according to an eighth embodiment.

FIG. 25 illustrates an overview of an information processing device according to a ninth embodiment.

DESCRIPTION OF EMBODIMENTS

Hereinafter, embodiments of the present disclosure will be described in detail with reference to the drawings. In each of the following embodiments, the same parts are denoted by the same reference signs, and redundant description will be omitted.

The present disclosure will be described in the following item order.
1. First Embodiment
1-1. Description of Premise—3D Model
1-2. Description of Premise—AR Application
1-3. Overview of Mobile Terminal
1-4. Hardware Configuration Of Mobile Terminal
1-5. Functional Configuration of Mobile Terminal
1-6. Method of Measuring Line-of-Sight Direction
1-7. Method of Changing Drawing Direction of 3D Model
1-8. Flow of Processing Performed by Mobile Terminal
1-9. Effects of First Embodiment
2. Second Embodiment
2-1. Overview of Second Embodiment
2-2. Flow of Processing Performed by Mobile Terminal
2-3. Effects of Second Embodiment
3. Third Embodiment
3-1. Functional Configuration of Mobile Terminal
3-2. Flow of Processing Performed by Mobile Terminal
3-3. Effects of Third Embodiment
4. Fourth Embodiment
4-1. Functional Configuration of Mobile Terminal
4-2. Flow of Processing Performed by Mobile Terminal
4-3. Effects of Fourth Embodiment
5. Fifth Embodiment
5-1. Functional Configuration of Mobile Terminal
5-2. Flow of Processing Performed by Mobile Terminal
5-3. Effects of Fifth Embodiment
6. Sixth Embodiment
6-1. Functional Configuration of Mobile Terminal
6-2. Flow of Processing Performed by Mobile Terminal
6-3. Effects of Sixth Embodiment
7. Seventh Embodiment
7-1. Functional Configuration of Mobile Terminal
7-2. Flow of Processing Performed by Mobile Terminal
7-3. Effects of Seventh Embodiment
8. Eighth Embodiment
8-1. Overview of Information Processing Device
8-2. Functional Configuration of Information Processing Device
8-3. Flow of Processing Performed by Information Processing Device
8-4. Effects of Eighth Embodiment
9. Ninth Embodiment
9-1. Overview of Information Processing Device
9-2. Functional Configuration of Information Processing Device
9-3. Flow of Processing Performed by Information Processing Device
9-4. Effects of Ninth Embodiment 1. First Embodiment Before describing embodiments of the present disclosure, premises necessary for implementing the embodiments will be described.

1-1. Description of Premise—3D Model

Figure 1:
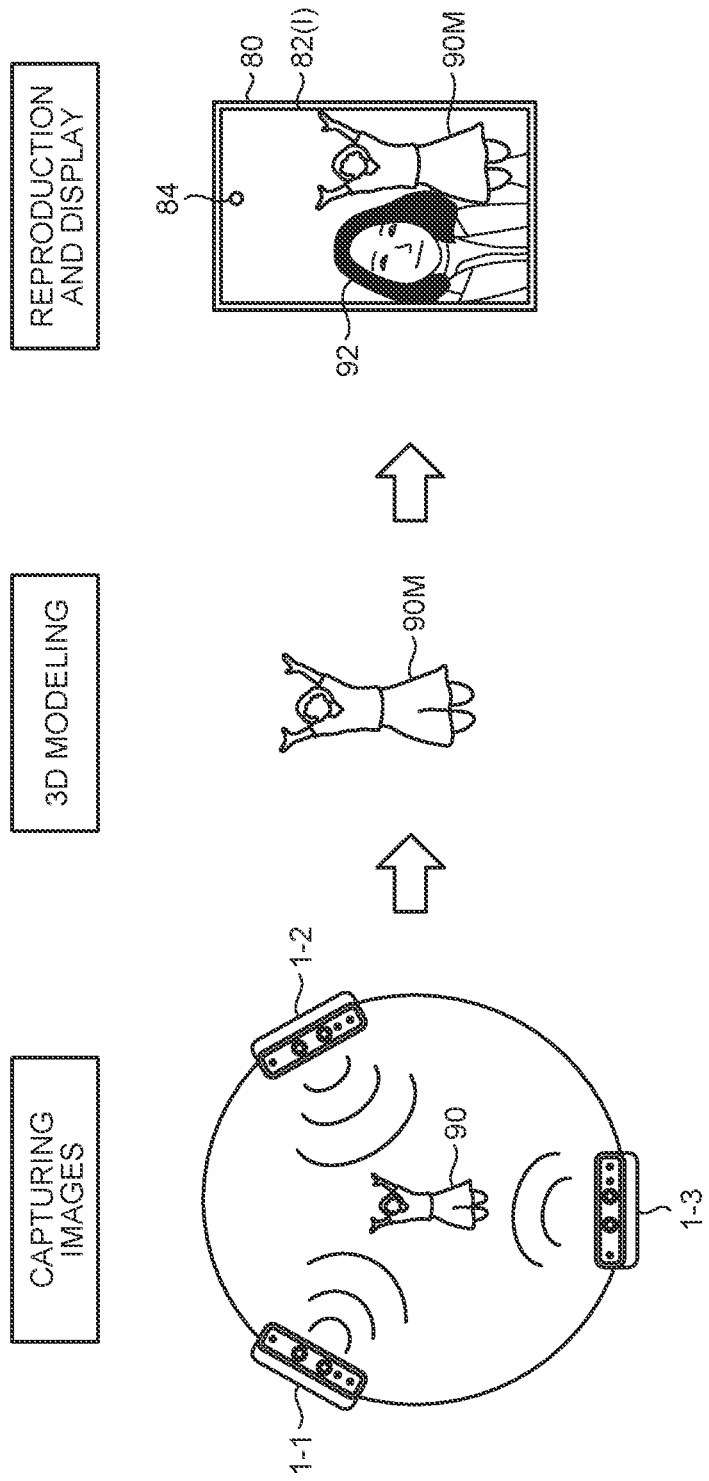
FIG. 1 illustrates an overview of a flow from capturing images to generating a 3D model.

FIG. 1 illustrates an overview of a flow from capturing images to generating a 3D model.

As illustrated in FIG. 1, the generation of the 3D model includes processing of capturing images of a subject 90 (object) by using a plurality of image capturing devices 1-1 to 1-3 and processing of performing 3D modeling to generate a 3D model 90M having 3D information regarding the subject 90.

Specifically, as illustrated in FIG. 1, the plurality of image capturing devices 1-1 to 1-3 are placed inward around the subject 90 existing in the real world so as to surround the subject 90. FIG. 1 illustrates an example where three image capturing devices are provided, and the image capturing devices 1-1 to 1-3 are arranged around the subject 90. In the example of FIG. 1, a person who performs a predetermined motion is defined as the subject 90.

3D modeling is performed by using a plurality of viewpoint images that are volumetrically captured by the three image capturing devices 1-1 to 1-3 in a synchronous manner from different viewpoints, thereby generating a 3D model of the subject 90 in the unit of a video frame of the three image capturing devices 1-1 to 1-3.

The 3D model is a model having 3D information regarding the subject 90. The 3D model 90M has mesh data called polygon mesh in which geometric information regarding the subject 90 is expressed by connection between vertices, and also has texture information and depth information (distance information) corresponding to each polygon mesh. The information that the 3D model 90M has is not limited thereto, and the 3D model 90M may have other information.

The 3D model 90M is subjected to so-called texture mapping in which a texture indicating a color, pattern, or feel of the mesh is pasted according to a mesh position. In the texture mapping, it is desirable to paste a view dependent texture in order to improve reality of the 3D model 90M. However, a view independent texture may be pasted to prevent an increase in an amount of calculation.

The generated 3D model 90M is given an identification number corresponding to an attribute (feature) that the 3D model 90M has. For example, in a case where the 3D model 90M is a person, attribute items such as a face direction, a line-of-sight direction, and a facial expression of the person are given respective identification numbers each indicating an attribute value of the attribute. The given identification numbers are collectively managed in a predetermined attribute table. In a case where an attribute value of a predetermined attribute item is given from the outside, the 3D model 90M corresponding to the given attribute value of the attribute item is read by referring to the attribute table. Note that a specific format of the attribute table is not limited.

Content data including the read 3D model is transmitted to a reproduction device and is reproduced therein. The content data including the 3D model is reproduced to render the 3D model, whereby a 3D video is displayed on a viewing device of a viewer.

In the example of FIG. 1, a mobile terminal 80 such as a smartphone or tablet terminal is used as the viewing device. A captured image I is displayed on a display screen 82 of the mobile terminal 80. In the captured image I, a subject 92 captured by a camera 84 included in the mobile terminal 80 is displayed. In the captured image I, the 3D model 90M is further displayed while being superimposed in response to an operation of an AR application (described later) that operates in the mobile terminal 80. Details thereof will be described later.

1-2. Description of Premise—AR Application

Figure 2:
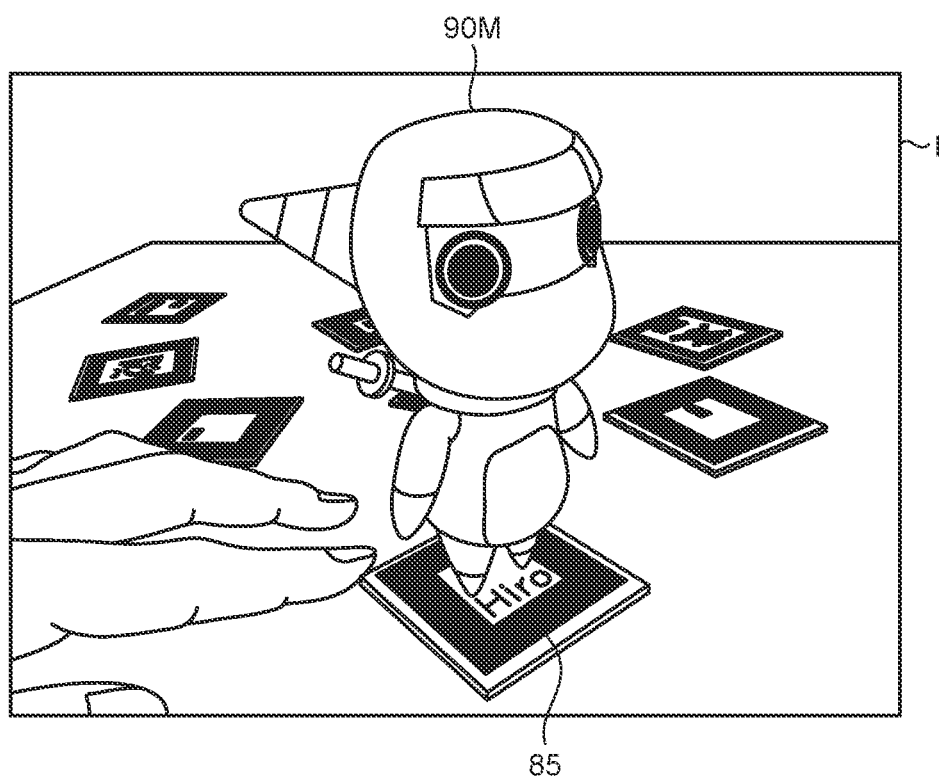
FIG. 2 is an explanatory diagram of an AR application.

FIG. 2 is an explanatory diagram of the AR application.

The augmented reality (AR) application is an application that operates in the mobile terminal 80 and displays the 3D model 90M on the display screen 82 of the mobile terminal 80 while superimposing the 3D model 90M at a timing when some trigger is generated.

Specifically, as illustrated in FIG. 2, in a case where an AR marker 85 serving as predetermined display is detected from the captured image I monitored by the mobile terminal 80, the 3D model 90M is displayed at a position corresponding to the AR marker 85. That is, the above trigger is to detect the predetermined display from the captured image I. The AR marker 85 may have any form such as a character string, symbol string, figure, picture, barcode, or two-dimensional code, and is not limited to these forms. The AR marker 85 may also be 2D display or 3D display.

Further, detection of a predetermined target (structure or natural object), which is obtained by performing spatial analysis or the like on the captured image I monitored on the display screen 82 by the mobile terminal 80, may be used as the trigger (markerless). Furthermore, whether or not a current position that the mobile terminal 80 acquires through a GPS receiver is a predetermined position may be used as the trigger.

1-3. Overview of Mobile Terminal

Figure 3:
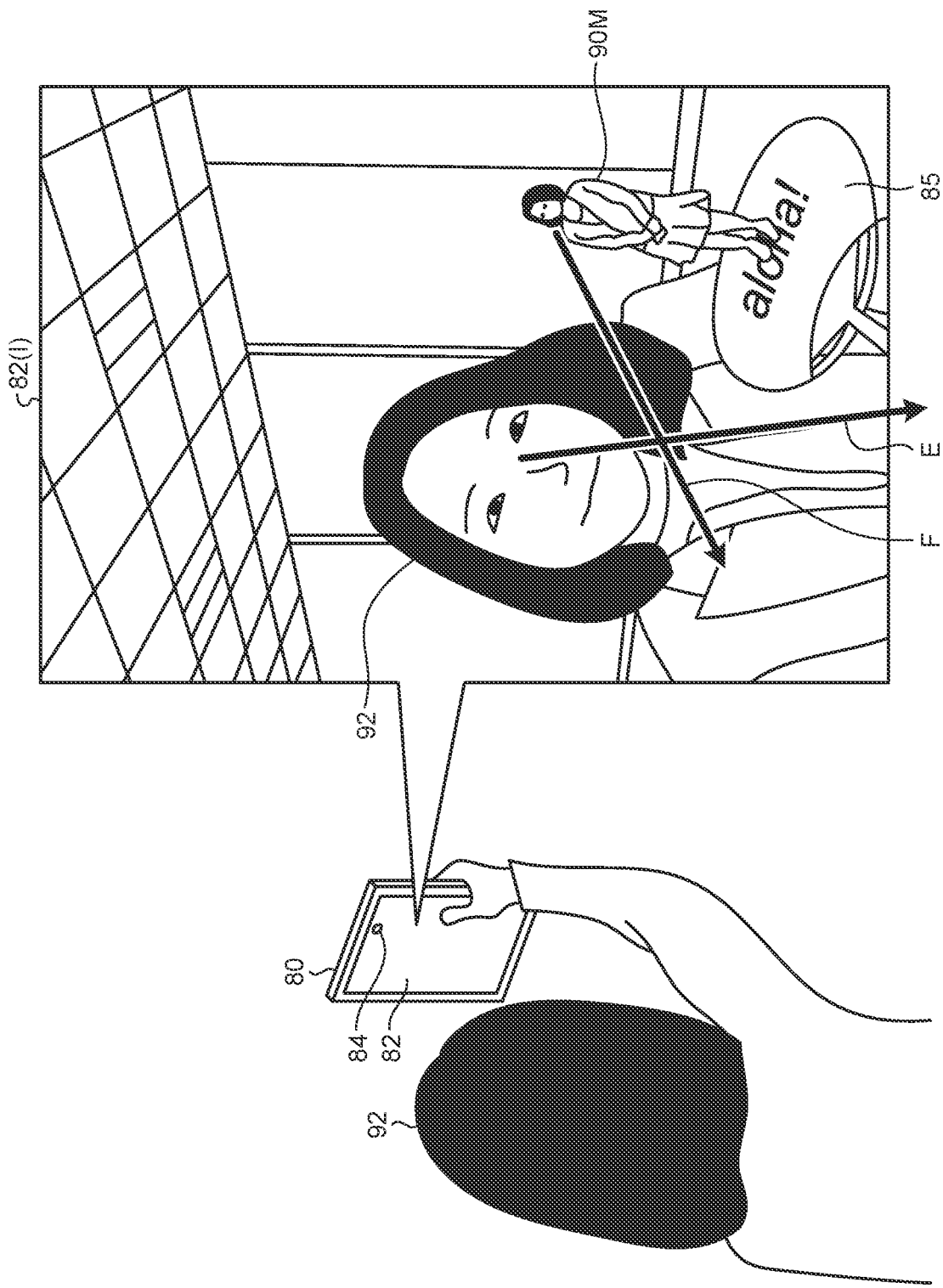
FIG. 3 is a first diagram illustrating an example of an operation status of a mobile terminal according to a first embodiment.

An overview of the mobile terminal 80 according to this embodiment will be described with reference to FIG. 3. The mobile terminal 80 is an example of an information processing device in the present disclosure. FIG. 3 is a first diagram illustrating an example of an operation status of the mobile terminal according to the first embodiment. The mobile terminal 80 is, for example, a smartphone operated by a user. The mobile terminal 80 includes the display screen 82 that displays an image and video and the camera 84 provided in the vicinity of the display screen 82 so as to face the same direction as the display screen 82.

The above-described AR application is mounted on the mobile terminal 80. When the AR application is executed, the mobile terminal 80 displays the captured image I captured by a camera 18 on the display screen 82 in real time (so-called live view), and determines whether or not the AR marker 85 appears in the captured image I. In a case where the AR marker 85 appears in the captured image I, the mobile terminal 80 displays the 3D model 90M while superimposing the 3D model 90M at a position corresponding to the AR marker 85.

Further, the mobile terminal 80 detects a feature of the subject 92 appearing in the captured image I, and changes a display mode of the 3D model 90M in accordance with the detected feature. Note that a representative scene of using the mobile terminal 80 is assumed to be a scene in which the user himself/herself acts as the subject 92 and takes a picture of the user himself/herself (selfie) by using the camera 84 of the mobile terminal 80.

In this embodiment, the mobile terminal 80 detects a line-of-sight direction E of the subject 92 appearing in the captured image I. In a case where the mobile terminal 80 determines that the line-of-sight direction E of the subject 92 faces the camera 84, the mobile terminal 80 directs a line-of-sight direction F of the 3D model 90M toward the camera 84.

Then, in a case where both the line-of-sight direction E of the subject 92 and the line-of-sight direction F of the 3D model 90M are toward the camera 84, the mobile terminal 80 takes a selfie.

Therefore, the mobile terminal 80 can cause the 3D model 90M to perform a motion or reaction in response to a motion or state of the subject 92. As described above, causing the 3D model 90M to perform some reaction or state transition will be referred to as an interactive 3D model AR.

Figure 4:
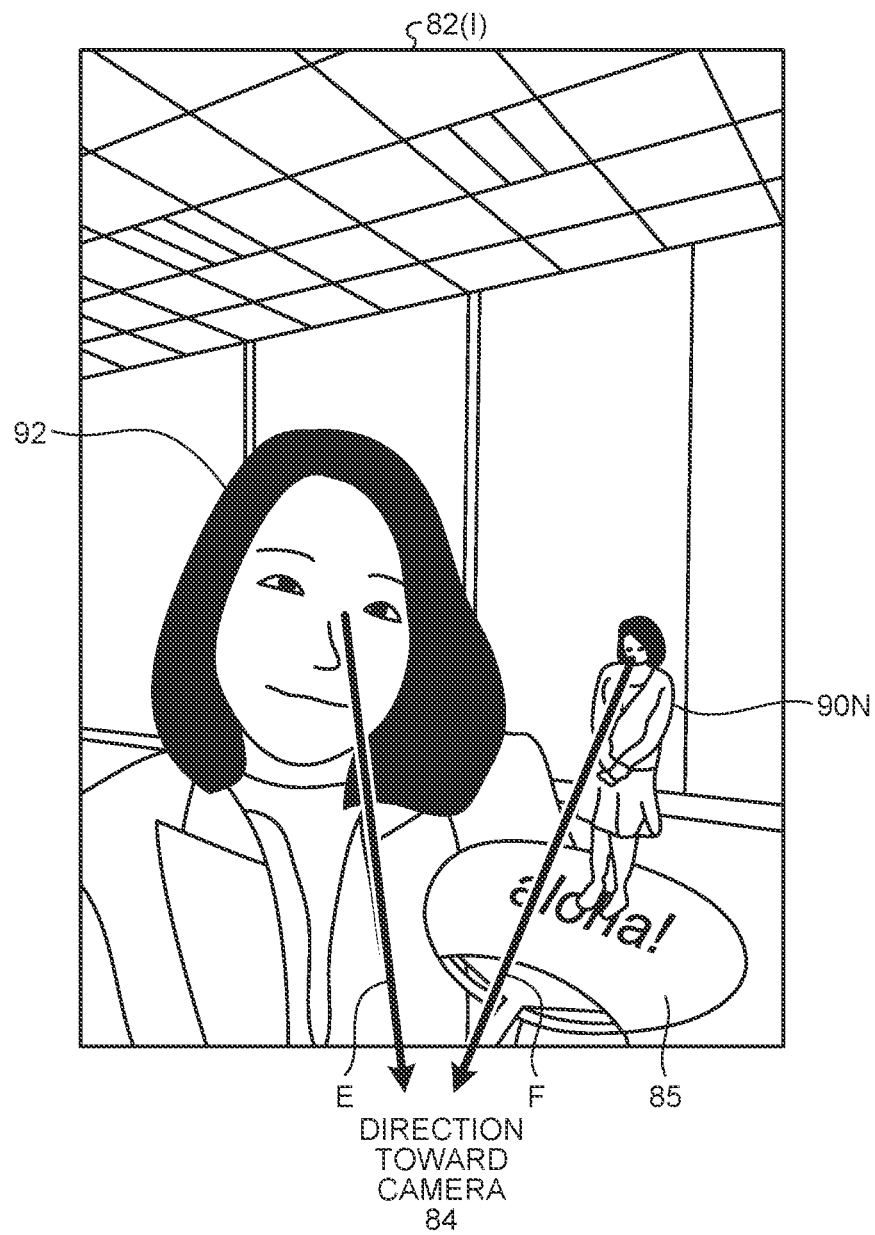
FIG. 4 is a second diagram illustrating an example of the operation status of the mobile terminal according to the first embodiment.

FIG. 4 is a second diagram illustrating an example of an operation status of the mobile terminal according to the first embodiment. The mobile terminal 80 detects the line-of-sight direction E of the subject 92 appearing in the captured image I displayed on the own display screen 82. Then, in a case where the detected line-of-sight direction E faces the camera 84, the mobile terminal 80 selects a 3D model 90N whose line-of-sight direction F faces the camera 84, and displays the 3D model 90N while superimposing the 3D model 90N on the captured image I.

Thereafter, the mobile terminal 80 takes a selfie while both the subject 92 and the 3D model 90N are looking at the camera. As described above, in a case where the line-of-sight direction E serving as a feature of the subject 92 faces the camera 84, it is possible to change a display mode of the 3D model 90N so that the line-of-sight direction F of the 3D model 90N faces the camera 84.

1-4. Hardware Configuration of Mobile Terminal

Figure 5:
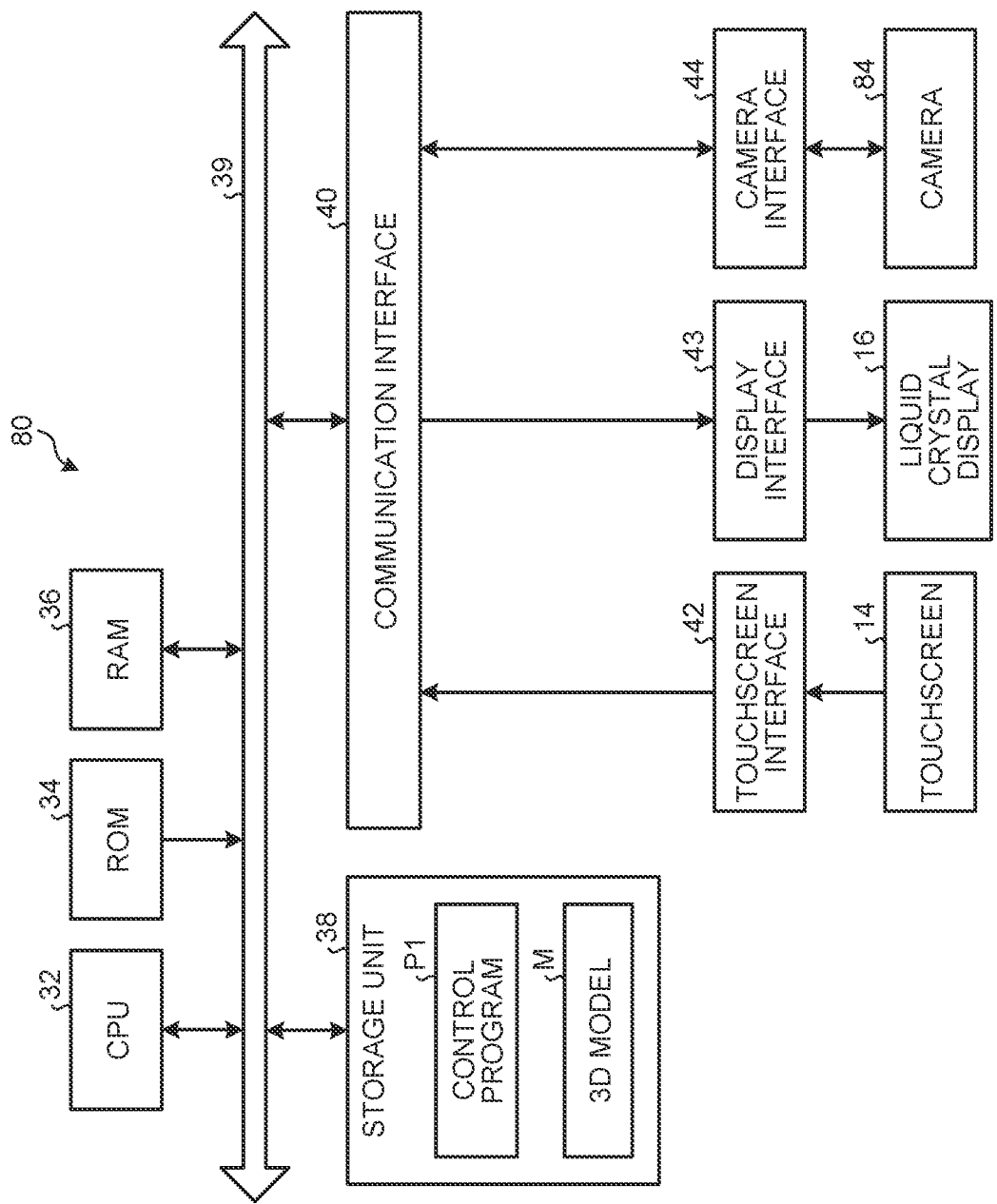
FIG. 5 is a hardware block diagram illustrating an example of a hardware configuration of the mobile terminal according to the first embodiment.

FIG. 5 is a hardware block diagram illustrating an example of a hardware configuration of the mobile terminal according to the first embodiment. In particular, FIG. 4 illustrates only elements related to this embodiment among hardware components included in the mobile terminal 80 of this embodiment. That is, the mobile terminal 80 is configured such that a central processing unit (CPU) 32, a read only memory (ROM) 34, a random access memory (RAM) 36, a storage unit 38, and a communication interface 40 are connected by an internal bus 39.

The CPU 32 controls the entire operation of the mobile terminal 80 by developing a control program P1 stored in the storage unit 38 or ROM 34 onto the RAM 36 and executing the control program P1. That is, the mobile terminal 80 has a configuration of a general computer that operates according to the control program P1. The control program P1 may be provided via a wired or wireless transmission medium such as a local area network, the Internet, or digital satellite broadcasting. The mobile terminal 80 may also execute a series of processing by hardware. The control program P1 executed by the CPU 32 may be a program in which processing is performed in time series in the order described in the present disclosure, or may be a program in which processing is performed in parallel or at a necessary timing such as when a call is made.

The storage unit 38 includes, for example, a flash memory, and stores the control program P1 executed by the CPU 32 and information such as a 3D model M. Because the 3D model M generally has a large capacity, the 3D model M may be downloaded from an external server (not illustrated) connected to the mobile terminal 80 via the Internet or the like and be stored in the storage unit 38 as necessary.

The communication interface 40 acquires, via a touchscreen interface 42, operation information regarding a touchscreen 14 stacked on a liquid crystal display 16 forming the display screen 82 of the mobile terminal 80. The communication interface 40 displays image information and video information on the liquid crystal display 16 via a display interface 43. The communication interface 40 controls an operation of the camera 84 via a camera interface 44.

The communication interface 40 communicates with the external server (not illustrated) or the like via wireless or wired communication. Therefore, for example, the mobile terminal 80 receives a newly created 3D model M and the like and transmits a generated captured image I to the outside.

1-5. Functional Configuration of Mobile Terminal

Figure 6:
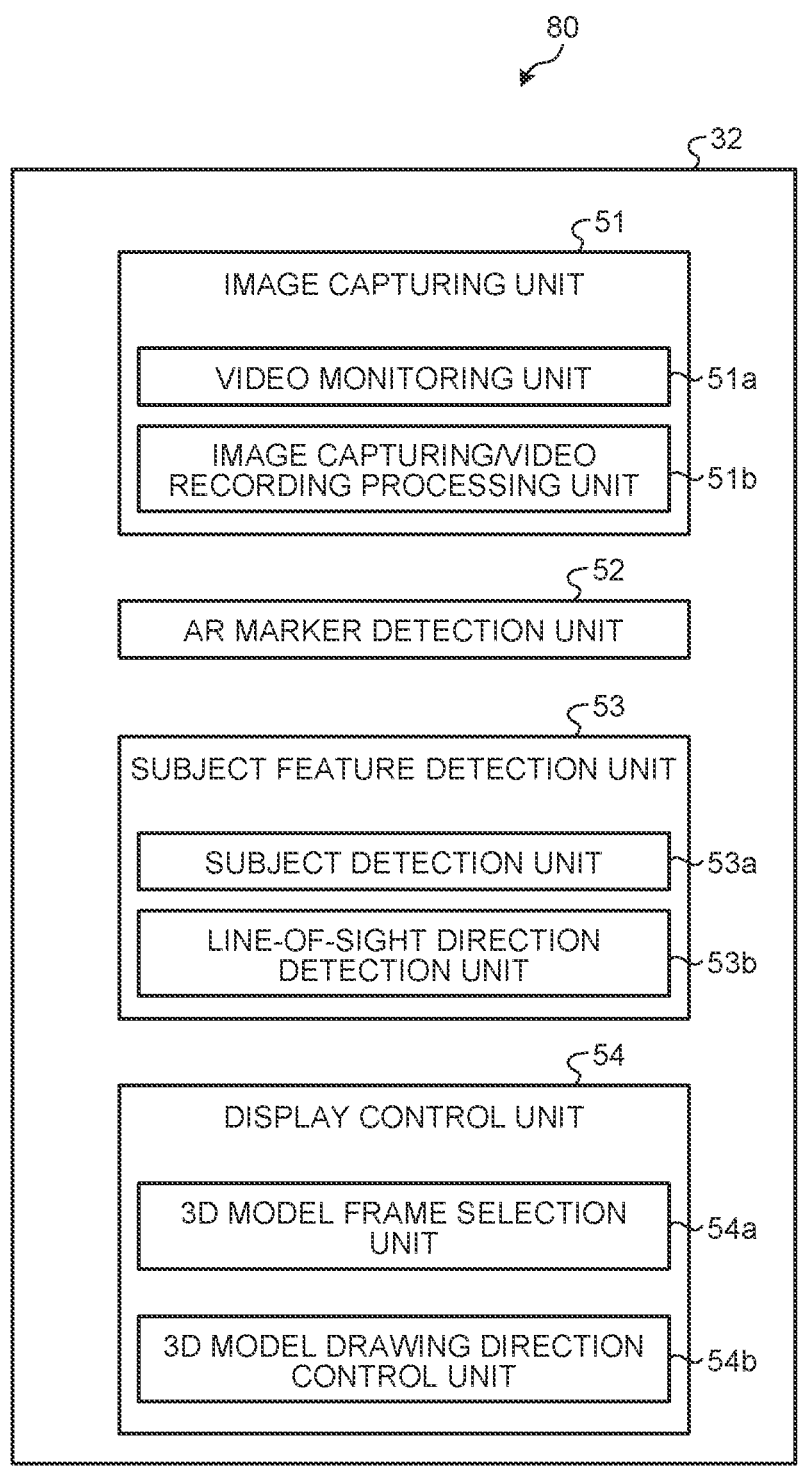
FIG. 6 is a functional block diagram illustrating an example of a functional configuration of the mobile terminal according to the first embodiment.

FIG. 6 is a functional block diagram illustrating an example of a functional configuration of the mobile terminal according to the first embodiment. The CPU 32 of the mobile terminal 80 develops the control program P1 onto the RAM 36 and executes the control program P1, thereby achieving an image capturing unit 51, an AR marker detection unit 52, a subject feature detection unit 53, and a display control unit 54 illustrated in FIG. 6 as functional units.

The image capturing unit 51 monitors a video, captures an image, and records a video by using the camera 84 included in the mobile terminal 80. The image capturing unit 51 further includes a video monitoring unit 51a and an image capturing/video recording processing unit 51b. The camera 84 is an actual camera existing in the real world, which is an example of a first image capturing unit in the present disclosure.

The video monitoring unit 51a performs so-called live view in which a video observed by the camera 84 is displayed on the display screen 82 of the mobile terminal D1 in real time.

The image capturing/video recording processing unit 51b stores the captured image I captured by the camera 84. Further, the image capturing/video recording processing unit 51b takes a selfie.

The AR marker detection unit 52 detects the AR marker 85 from the captured image I monitored by processing of the video monitoring unit 51a. Specifically, the AR marker detection unit 52 performs template matching or the like to detect the predetermined AR marker 85 determined in advance.

The subject feature detection unit 53 detects a subject simultaneously displayed with the 3D model 90M in the captured image I monitored by the processing of the video monitoring unit 51a. Then, the subject feature detection unit 53 detects a feature of the detected subject 92. The subject feature detection unit 53 includes a subject detection unit 53a and a line-of-sight direction detection unit 53b. The subject feature detection unit 53 is an example of a detection unit in the present disclosure.

The subject detection unit 53a detects the subject 92 displayed simultaneously with the 3D model 90M in the captured image I monitored by the image capturing unit 51.

The line-of-sight direction detection unit 53b detects the line-of-sight direction E of the subject 92 detected by the subject detection unit 53a. The line-of-sight direction E is an example of the feature of the subject 92 in the present disclosure.

The display control unit 54 controls the 3D model 90M displayed in the captured image I. More specifically, the display control unit 54 changes the display mode of the 3D model 90M in accordance with the line-of-sight direction E of the subject 92 detected by the subject feature detection unit 53. In this embodiment, in a case where the line-of-sight direction E of the subject 92 faces the camera 84, that is, in a case where the subject 92 looks at the camera, the display control unit 54 changes the line-of-sight direction F of the 3D model 90M toward the camera 84. That is, the line-of-sight direction F is an example of the display mode in the present disclosure. The display control unit 54 includes a 3D model frame selection unit 54a and a 3D model drawing direction control unit 54b. The display control unit 54 is an example of a control unit in the present disclosure.

The 3D model frame selection unit 54a selects a default 3D model 90M determined in advance on the basis of the AR marker 85 from a plurality of 3D models M stored in the storage unit 38. The 3D model frame selection unit 54a further selects, from the plurality of 3D models M stored in the storage unit 38, a 3D model 90M having the line-of-sight direction F corresponding to the line-of-sight direction E of the subject 92 detected by the line-of-sight direction detection unit 53b. More specifically, in a case where the subject 92 looks at the camera, the 3D model frame selection unit 54a selects the 3D model 90M whose line-of-sight direction F faces the camera 84.

The 3D model drawing direction control unit 54b displays the default 3D model 90M selected by the 3D model frame selection unit 54a while superimposing the 3D model 90M on the captured image I displayed on the display screen 82 of the mobile terminal 80. The 3D model drawing direction control unit 54b rotates the 3D model 90M to change a direction of the 3D model 90M. The 3D model drawing direction control unit 54b also rotates a coordinate system on which the 3D model 90M is placed to change the direction of the 3D model 90M, thereby generating the 3D model 90N. The 3D model drawing direction control unit 54b displays the 3D model 90N whose direction has been changed while superimposing the 3D model 90N on the captured image I displayed on the display screen 82 of the mobile terminal 80.

1-6. Method of Measuring Line-of-Sight Direction

Figure 7:
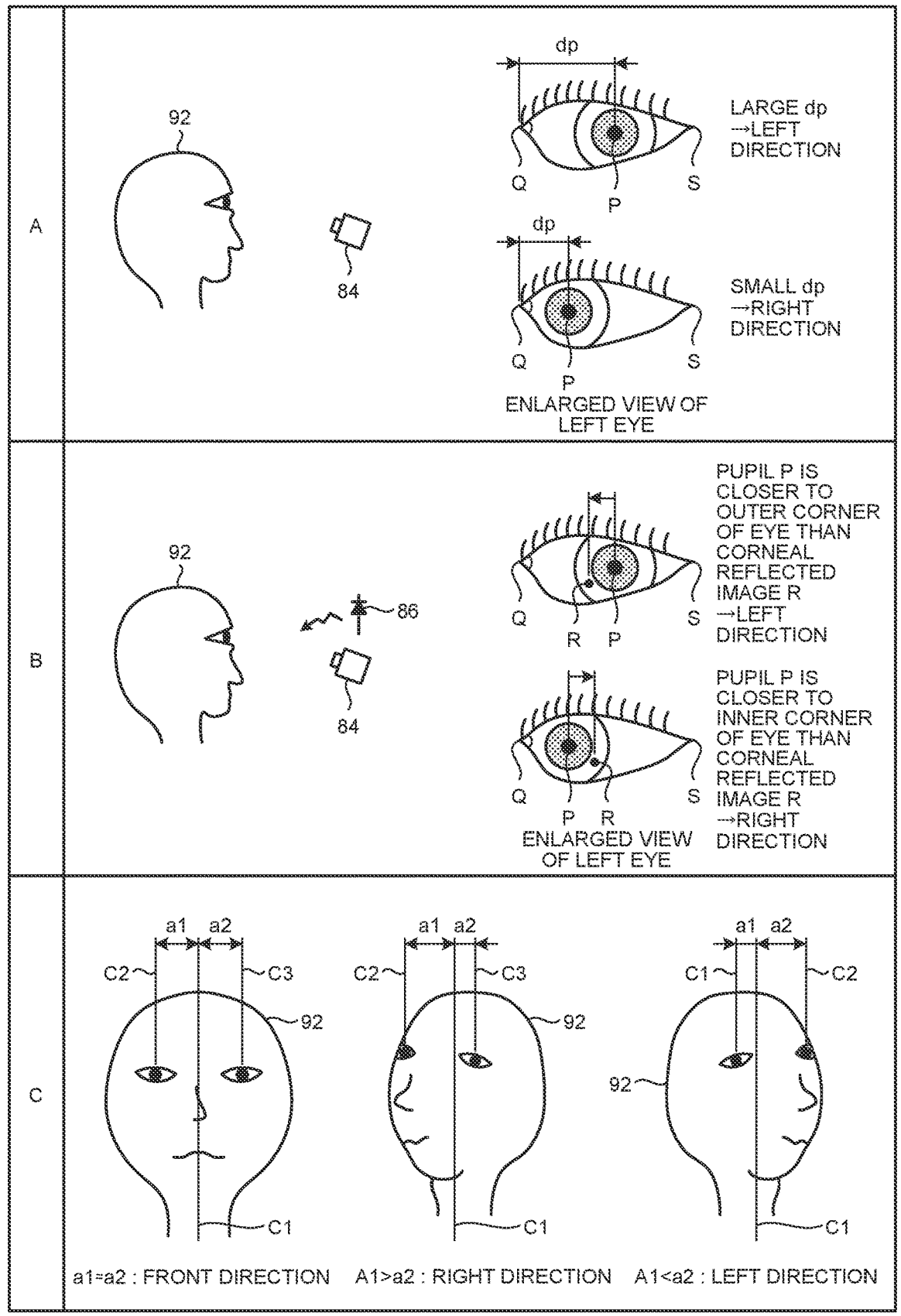
FIG. 7 is an explanatory diagram of a method of measuring a line-of-sight direction.

FIG. 7 is an explanatory diagram of a method of measuring a line-of-sight direction. There are proposed various methods for detecting the line-of-sight direction E from a face image of the subject 92, and any of the methods may be used in this embodiment.

FIG. 7 illustrates three representative methods of measuring the line-of-sight direction. FIG. 7A illustrates a method of capturing an image of a face of the subject 92 by using the camera 84, detecting an eyeball region from the captured face image, and detecting the line-of-sight direction E on the basis of a shape feature of the detected eyeball.

FIG. 7A illustrates an enlarged view of a left eye of the subject 92 detected from the captured image I captured by the camera 84. A distance dp between the center of a pupil P and an inner corner Q of the eye changes according to the line-of-sight direction. Specifically, as illustrated in FIG. 7A, when the line of sight is directed to the left (toward an outer corner S of the eye), the distance dp increases. Meanwhile, when the line of sight is directed to the right (toward the inner corner Q of the eye), the distance dp decreases. Therefore, it is possible to calculate an approximate line-of-sight direction by measuring the distance dp.

FIG. 7B illustrates an example where an image of the face of the subject 92 is captured by the camera 84 while the face is being irradiated with an infrared LED 86. The camera 84 is assumed to have sensitivity to light having a wavelength emitted by the infrared LED 86. The method of measuring the line of sight in FIG. 7B is to detect the eyeball region from the captured face image and detect the line-of-sight direction E on the basis of a position of a reflected image of a cornea (corneal reflected image) of the detected eyeball irradiated with the infrared LED 86. Because the wavelength of the light emitted by the infrared LED 86 is invisible, it is possible to detect the line-of-sight direction without disturbing the subject 92.

FIG. 7B illustrates an enlarged view of the left eye of the subject 92 detected from the captured image I captured by the camera 84. A positional relationship between the center of the pupil P and the corneal reflected image R changes according to the line-of-sight direction. Specifically, as illustrated in FIG. 7B, when the line of sight is directed to the left (toward the outer corner S of the eye), the pupil P is located closer to the outer corner S of the eye than the corneal reflected image R. Meanwhile, when the line of sight is directed to the right (toward the inner corner Q of the eye), the pupil P is located closer to the inner corner Q of the eye than the corneal reflected image R. Therefore, it is possible to detect an approximate line-of-sight direction by measuring the positional relationship between the pupil P and the corneal reflected image R.

In FIG. 7C, an image of the face of the subject 92 is captured by the camera 84, and the line-of-sight direction is detected on the basis of a direction of the captured face. In a case where a human quickly or greatly moves his/her line-of-sight direction, the human generally changes the line-of-sight direction by moving his/her head, instead of moving his/her eyeballs themselves. Therefore, it can be considered that the direction of the face and the line-of-sight direction substantially match in many cases. In a case where the above approximation holds, it is possible to detect the line-of-sight direction by using the method of FIG. 7C.

In a case where the subject 92 faces the front as illustrated in a left part of FIG. 7C, a distance a1 between a center line C1 and a straight line C2 is substantially equal to a distance a2 between the center line C1 and a straight line C3. The center line C1 passes through the face of the subject 92 in a longitudinal direction, the straight line C2 passes through a right eye and is parallel to the center line C1, and the straight line C3 passes through the left eye and is parallel to the center line C1.

In a case where the subject 92 faces the right direction as illustrated in a central part of FIG. 7C, the distance a1 is larger than the distance a2. Meanwhile, in a case where the subject 92 faces the left direction as illustrated in a right part of FIG. 7C, the distance a1 is smaller than the distance a2.

It is possible to detect an approximate line-of-sight direction by comparing a magnitude relationship between the distance a1 and the distance a2 as described above.

Note that there are individual differences in shape and motion of eyeballs. Therefore, recently, a method using a highly robust eyeball model created by using a method such as machine learning is employed to stably detect the eyeballs of the subject 92.

1-7. Method of Changing Drawing Direction of 3D Model

FIG. 8 illustrates a method of changing the drawing direction of the 3D model. Because the 3D model 90M has directionality, the 3D model 90M is drawn in a default direction, for example, a positive direction of the Z axis when the 3D model 90M is drawn on the display screen 82. In this embodiment, the direction of the 3D model 90M is changed according to the line-of-sight direction E serving as the feature of the subject 92, and the 3D model 90M is drawn as the 3D model 90N. Therefore, in this embodiment, two methods of controlling the drawing direction described below are used in combination.

As illustrated in FIG. 8A, a first method is a method of rotating the 3D model 90M itself in a target direction to obtain the 3D model 90N.

As illustrated in FIG. 8B, a second method is a method of rotating, in a target direction, a coordinate system XYZ on which the 3D model 90M is placed and drawing the 3D model 90N on the rotated coordinate system.

Any method may be used in this embodiment. The method of rotating the coordinate system XYZ on which the 3D model 90M is placed requires a small amount of calculation, but reality of the 3D model 90M may be reduced in a case where the 3D model 90M has a view independent texture. Meanwhile, the method of rotating the 3D model 90M itself requires a larger amount of calculation, but the reality of the 3D model 90M is maintained in a case where the 3D model 90M has a view dependent texture. Therefore, it is desirable to change the drawing direction after sufficiently considering which method is applied.

For example, in a case where a rotation amount of the 3D model 90M is small, it is desirable to apply the method of rotating the coordinate system because reduction in the reality of the 3D model 90M due to the rotation is considered small. Meanwhile, in a case where the rotation amount of the 3D model 90M is large, it is desirable to apply the method of rotating the 3D model 90M itself in order to maintain the reality of the 3D model 90M.

1-8. Flow of Processing Performed by Mobile Terminal

Figure 9:
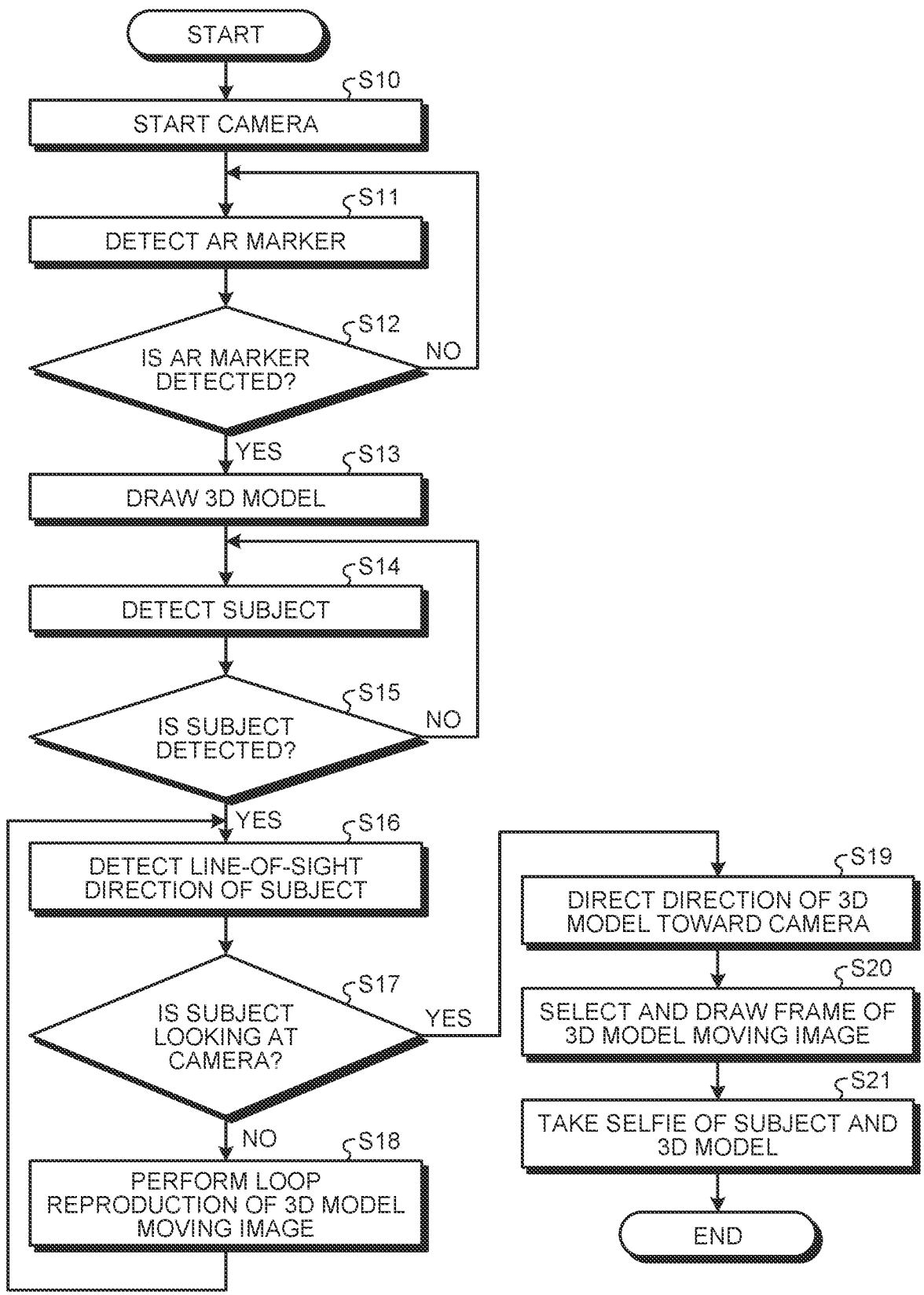
FIG. 9 is a flowchart illustrating an example of a flow of processing performed by the mobile terminal according to the first embodiment.

FIG. 9 is a flowchart illustrating an example of a flow of processing performed by the mobile terminal according to the first embodiment. Hereinafter, the flow of the processing will be described in order.

The video monitoring unit 51a starts the camera 84 (step S10). Hereinafter, the camera 84 is in live view in which the captured image I is monitored in real time.

The AR marker detection unit 52 detects the AR marker 85 from the captured image I (step S11).

Then, the AR marker detection unit 52 determines whether or not the AR marker 85 has been detected (step S12). In a case where it is determined that the AR marker 85 has been detected (step S12: Yes), the process proceeds to step S13. Meanwhile, in a case where it is determined that the AR marker 85 has not been detected (step S12: No), the process returns to step S11.

In a case where the determination result is Yes in step S12, the 3D model frame selection unit 54a selects the default 3D model 90M determined in advance on the basis of the AR marker 85 from the 3D models M stored in the storage unit 38. Then, the 3D model drawing direction control unit 54*b* displays the selected 3D model 90M while superimposing the 3D model 90M at a position corresponding to the AR marker 85 in the captured image I (step S13).

Next, the subject detection unit 53*a* detects the subject 92 from the captured image I (step S14).

The subject detection unit 53*a* determines whether or not the subject 92 has been detected (step S15). In a case where it is determined that the subject 92 has been detected (step S15: Yes), the process proceeds to step S16. Meanwhile, in a case where it is determined that the subject 92 has not been detected (step S15: No), the process returns to Step S14.

In a case where the determination result is Yes in step S15, the line-of-sight direction detection unit 53*b* detects the line-of-sight direction of the subject 92 (step S16).

Then, the line-of-sight direction detection unit 53*b* determines whether or not the subject 92 looks at the camera, that is, whether or not the line-of-sight direction E of the subject 92 faces the camera 84 (step S17). In a case where it is determined that the line-of-sight direction E of the subject 92 faces the camera 84 (step S17: Yes), the process proceeds to step S19. Meanwhile, in a case where it is determined that the line-of-sight direction E of the subject 92 does not face the camera 84 (step S17: No), the process proceeds to step S18.

In a case where the determination result is No in step S17, the 3D model frame selection unit 54*a* selects a moving image frame of the 3D model 90M from the 3D models M stored in the storage unit 38. Then, the 3D model drawing direction control unit 54*b* performs loop reproduction of the moving image frame selected by the 3D model frame selection unit 54*a* (step S18). Thereafter, the process returns to step S16.

Meanwhile, in a case where the determination result is Yes in step S17, the 3D model drawing direction control unit 54*b* directs the direction of the 3D model 90M toward the camera 84 (step S19). The 3D model drawing direction control unit 54*b* may set the direction of the 3D model 90M by rotating the direction of the coordinate system on which the 3D model 90M is drawn or may set the direction thereof by rotating the 3D model 90M itself.

Next, the 3D model drawing direction control unit 54*b* draws the 3D model 90N whose eyes are opened and line-of-sight direction F faces the camera 84, which is selected by the 3D model frame selection unit 54*a*, at a drawing position set in step S19 (step S20).

Then, the image capturing/video recording processing unit 51*b* takes a selfie while both the subject 92 and the 3D model 90N are looking at the camera (step S21).

1-9. Effects of First Embodiment

As described above, according to the mobile terminal 80 of the first embodiment, the subject feature detection unit 53 (detection unit) detects the line-of-sight direction E (feature) of the subject 92 displayed simultaneously with the 3D model 90M in the captured image I. Then, the display control unit 54 (control unit) changes the line-of-sight direction F (display mode) of the 3D model 90M so that the 3D model 90M faces the camera 84 in accordance with the line-of-sight direction E of the subject 92 detected by the subject feature detection unit 53.

This makes it possible to cause the 3D model 90M displayed in the captured image I including the subject 92 to perform an interactive motion or reaction of looking at the camera together with the subject 92.

Further, according to the mobile terminal 80 of the first embodiment, the subject feature detection unit 53 (detection unit) detects the line-of-sight direction E serving as the feature of the subject 92, and the display control unit 54 (control unit) changes the line-of-sight direction F (face direction) of the 3D model 90M in accordance with the detected line-of-sight direction E of the subject 92.

This makes it possible to cause the 3D model 90M to perform an interactive motion or reaction in accordance with the line-of-sight direction E of the subject 92.

Further, according to the mobile terminal 80 of the first embodiment, the display control unit 54 (control unit) changes the direction of the 3D model 90M by rotating the 3D model 90M in accordance with the line-of-sight direction E of the subject 92.

Therefore, even in a case where the 3D model 90M is rotated, it is possible to maintain the reality of the 3D model 90M having a view dependent texture.

Further, according to the mobile terminal 80 of the first embodiment, the display control unit 54 (control unit) changes the direction of the 3D model 90M by rotating the coordinate system on which the 3D model 90M is placed in accordance with the line-of-sight direction E of the subject 92.

This makes it possible to execute the processing of rotating the 3D model 90M at a high speed with a small amount of calculation.

Further, according to the mobile terminal 80 of the first embodiment, in a case where the subject feature detection unit 53 (detection unit) detects that the line-of-sight direction E of the subject 92 faces a direction from which the captured image I has been captured, the display control unit 54 (control unit) changes the direction of the 3D model 90M to the direction from which the captured image I has been captured.

This makes it possible to cause the 3D model 90M to perform an interactive motion or reaction in response to the subject 92.

Further, in the mobile terminal 80 of the first embodiment, the image capturing unit 51 captures an image of the subject 92 and the 3D model 90M whose display mode has been changed by the display control unit 54 (control unit).

This makes it possible to, for example, take a selfie of the subject 92 and the 3D model 90M by using the camera 84.

Further, in the mobile terminal 80 of the first embodiment, the image capturing unit 51 is the camera 84 existing in the real world or a virtual camera 84V existing in a virtual world (see an eighth embodiment).

This makes it possible to take a selfie of the subject 92 and the 3D model 90M by using the camera 84. Further, it is possible to take a selfie of an avatar 92*a* that is a virtual self of the subject 92 and the 3D model 90M by using the virtual camera 84V, which will be described in detail in the eighth embodiment.

Further, according to the mobile terminal 80 of the first embodiment, the 3D model 90M is a model having 3D information regarding the subject 90 (object) existing in the real world, the 3D information being generated by using a plurality of viewpoint images of the subject 90 captured from different viewpoints.

This makes it possible to generate the 3D model 90M that can be observed from a plurality of different directions with the same quality. Therefore, it is possible to freely change the direction of the 3D model 90M displayed while being superimposed on the captured image I while maintaining display quality of the 3D model 90M.

Further, according to the mobile terminal 80 of the first embodiment, in a case where the AR marker 85 (predetermined display) is displayed in the captured image I, the display control unit 54 (control unit) displays the 3D model 90M while superimposing the 3D model 90M on the captured image I.

This makes it possible to easily and quickly display the 3D model 90M without performing a complicated operation or procedure.

2. Second Embodiment

A second embodiment of the present disclosure is an example of the mobile terminal 80 (information processing device) having a function of causing the subject 92 and the 3D model 90M to gaze at each other.

Description of a hardware configuration and functional configuration of the mobile terminal 80 of this embodiment will be omitted because those configurations are the same as those of the mobile terminal 80 described in the first embodiment. However, a control program stored in the storage unit 38 is different from the control program P1 (see FIG. 5) in order to exert a function unique to this embodiment.

2-1. Overview of Second Embodiment

Figure 10:
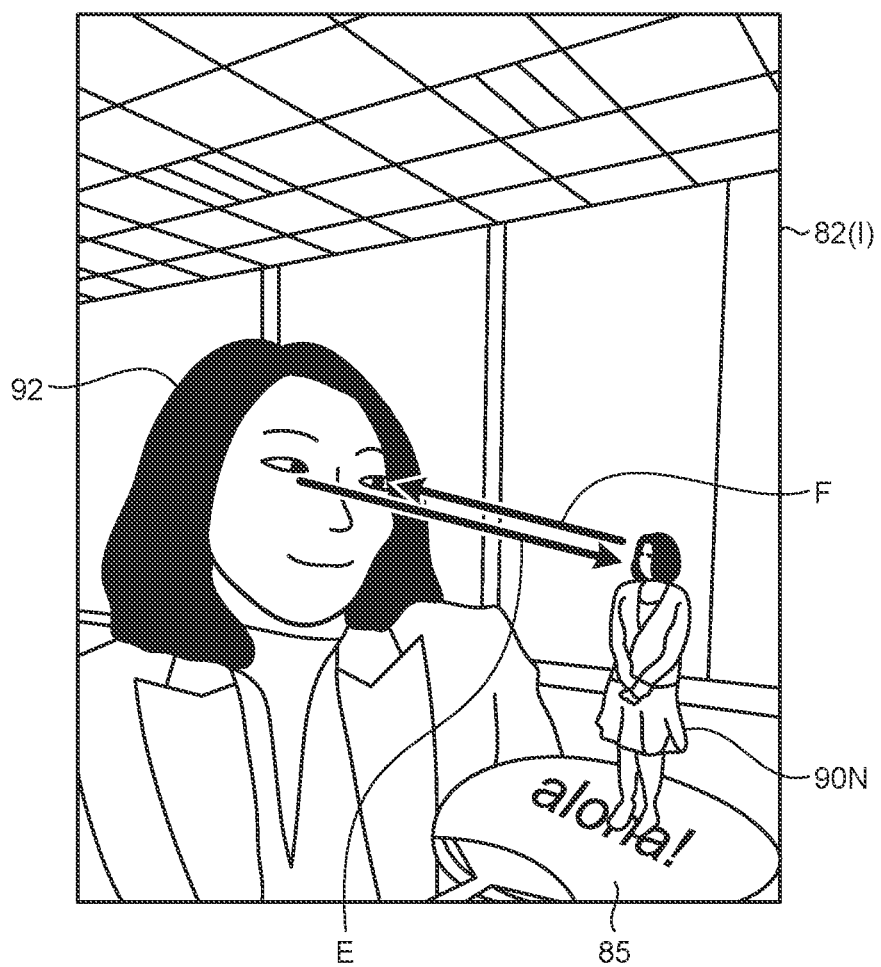
FIG. 10 illustrates an example of an operation status of a mobile terminal according to a second embodiment.

FIG. 10 illustrates an example of an operation status of the mobile terminal according to the second embodiment. The mobile terminal 80 detects the line-of-sight direction E of the subject 92 appearing in the captured image I displayed on the own display screen 82. Then, in a case where the detected line-of-sight direction E faces the vicinity of the AR marker 85, the mobile terminal 80 selects the 3D model 90N whose line-of-sight direction F faces the subject 92, and displays the 3D model 90N while superimposing the 3D model 90N on the captured image I.

Then, the mobile terminal 80 takes a selfie while the subject 92 and the 3D model 90N are gazing at each other. As described above, in a case where the line-of-sight direction E serving as the feature of the subject 92 faces the vicinity of the AR marker 85, it is possible to change the display mode of the 3D model 90N so that the line-of-sight direction F of the 3D model 90N faces the subject 92.

2-2. Flow of Processing Performed by Mobile Terminal

Figure 11:
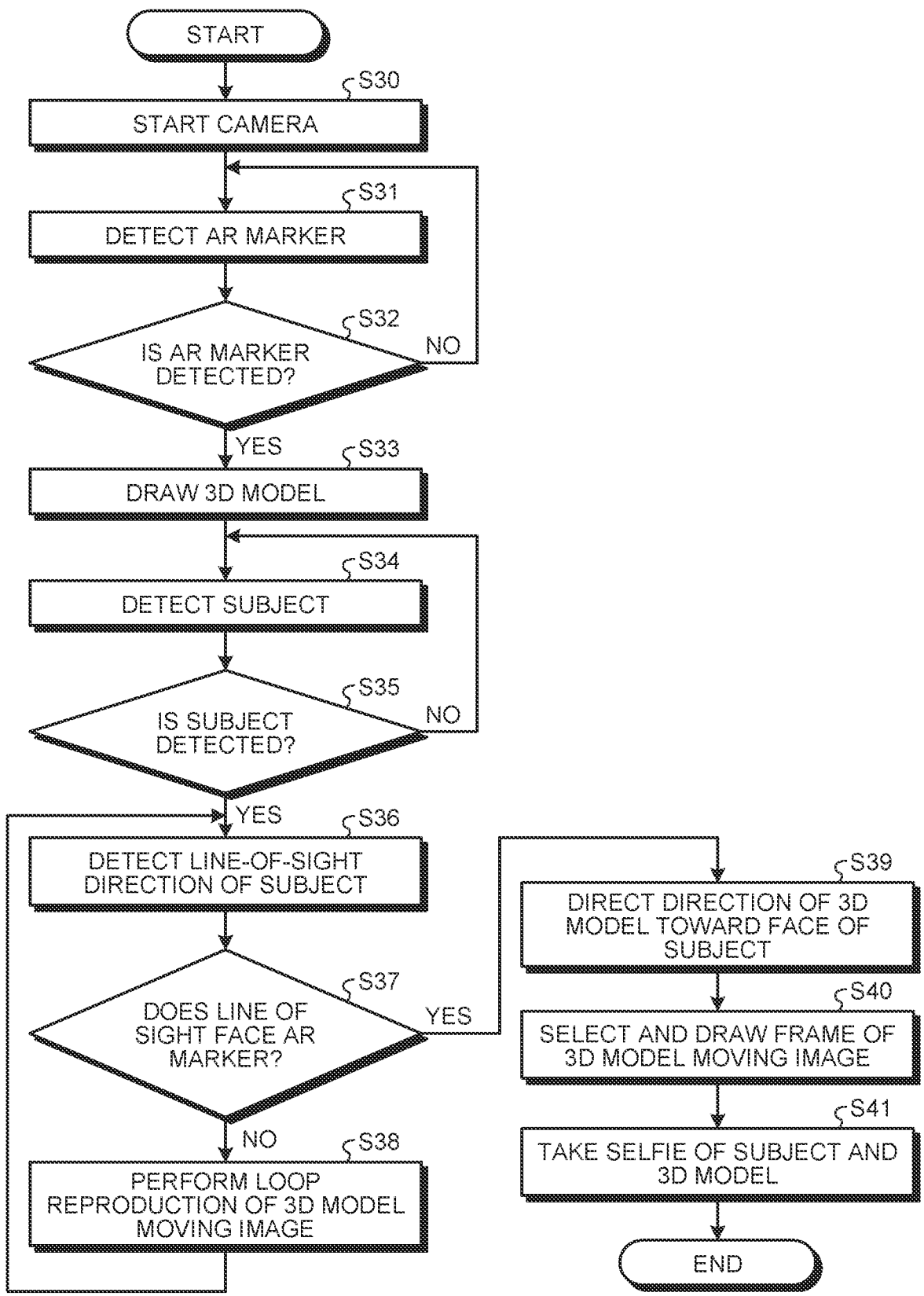
FIG. 11 is a flowchart illustrating an example of a flow of processing performed by the mobile terminal according to the second embodiment.

FIG. 11 is a flowchart illustrating an example of a flow of processing performed by the mobile terminal according to the first embodiment. Hereinafter, the flow of the processing will be described in order.

Description of a flow of processing from steps S30 to S36 in FIG. 11 will be omitted because the flow is the same as that of the processing from steps S10 to S16 in FIG. 9 described in the first embodiment.

After the line-of-sight direction detection unit 53b detects the line-of-sight direction of the subject 92 in step S36, the line-of-sight direction detection unit 53b determines whether or not the subject 92 faces the AR marker 85 (step S37). In a case where it is determined that the line-of-sight direction of the subject 92 faces the AR marker 85 (step S37: Yes), the process proceeds to step S39. Meanwhile, in a case where it is determined that the line-of-sight direction of the subject 92 does not face the AR marker 85 (step S37: No), the process proceeds to step S38.

In a case where the determination result is No in step S37, the 3D model frame selection unit 54a selects a moving image frame of the 3D model 90M from the 3D models M stored in the storage unit 38. Then, the 3D model drawing direction control unit 54b performs loop reproduction of the moving image frame selected by the 3D model frame selection unit 54a (step S38). Thereafter, the process returns to step S36.

Meanwhile, in a case where the determination result is Yes in step S37, the 3D model drawing direction control unit 54b directs a drawing position of the 3D model 90M toward the face of the subject 92 (step S39).

Next, the 3D model drawing direction control unit 54b draws the 3D model 90N whose eyes are opened and line-of-sight direction faces the face of the subject 92, which is selected by the 3D model frame selection unit 54a, at the drawing position set in step S39 (step S40).

Then, the image capturing/video recording processing unit 51b takes a selfie while the subject 92 and the 3D model 90N are gazing at each other (step S41).

2-3. Effects of Second Embodiment

As described above, according to the mobile terminal 80 of the second embodiment, in a case where the subject feature detection unit 53 (detection unit) detects that the line-of-sight direction E of the subject 92 faces the 3D model 90M, the display control unit 54 (control unit) draws the 3D model 90N whose direction has been changed to face the subject 92.

Therefore, it is possible to take a selfie while the subject 92 and the 3D model 90N are gazing at each other.

3. Third Embodiment

A third embodiment of the present disclosure is an example of the mobile terminal 80 (information processing device) having a function of, in a case where the subject 92 is looking at the camera 84 with a smile, taking a selfie while directing the 3D model 90M with a smile toward the camera 84. That is, the mobile terminal 80 of this embodiment changes the display mode (line-of-sight direction and facial expression) of the 3D model 90M in accordance with the line-of-sight direction and facial expression serving as features of the subject 92.

Description of a hardware configuration of the mobile terminal 80 of this embodiment will be omitted because the configuration is the same as that of the mobile terminal 80 described in the first embodiment. Note that a control program stored in the storage unit 38 is different from the control program P1 (see FIG. 5) in order to exert a function unique to this embodiment.

3-1. Functional Configuration of Mobile Terminal

Figure 12:
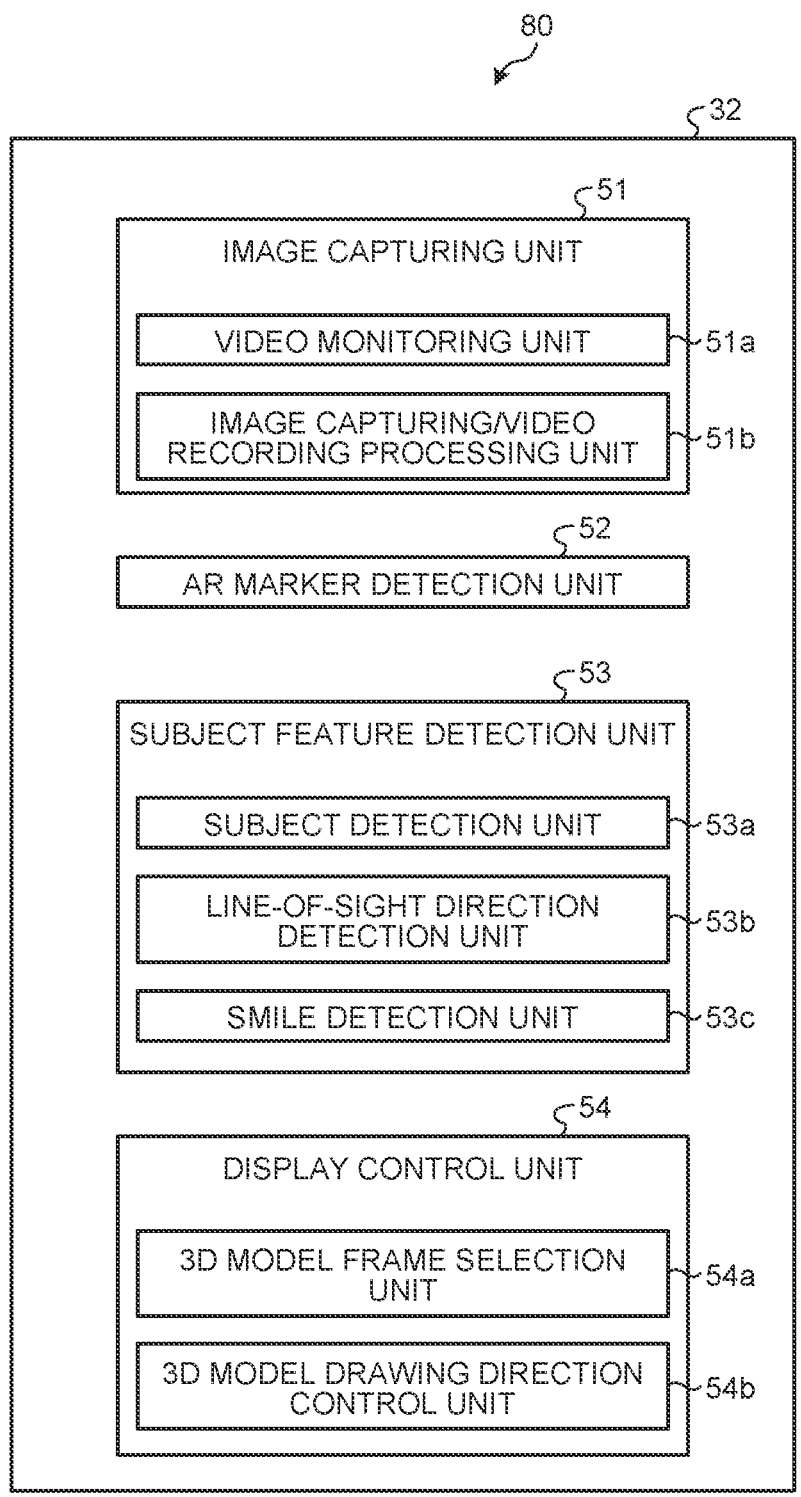
FIG. 12 is a functional block diagram illustrating an example of a functional configuration of a mobile terminal according to a third embodiment.

FIG. 12 is a functional block diagram illustrating an example of a functional configuration of the mobile terminal according to the third embodiment. The mobile terminal 80 of the third embodiment has a functional configuration obtained by adding some functions to the mobile terminal 80 (see FIG. 6) of the first embodiment. Hereinafter, only differences in functional configuration from the mobile terminal 80 of the first embodiment will be described.

That is, the subject feature detection unit 53 includes a smile detection unit 53c in addition to the subject detection unit 53a and the line-of-sight direction detection unit 53b.

The smile detection unit 53c detects whether or not the subject 92 appearing in the captured image I smiles. The smile detection unit 53c extracts a face region of the subject 92 detected by the subject detection unit 53a. Then, the smile detection unit 53c collates the extracted face region with a sample indicating a smile among a large number of facial expression samples stored in a facial expression database (not illustrated in FIG. 12). In a case where the extracted face region indicates a high collation degree with the sample indicating a smile, the smile detection unit 53c determines that the subject 92 smiles.

Note that the smile detection unit 53c may determine whether or not the subject smiles by using other image processing algorithms.

3-2. Flow of Processing Performed by Mobile Terminal

Figure 13:
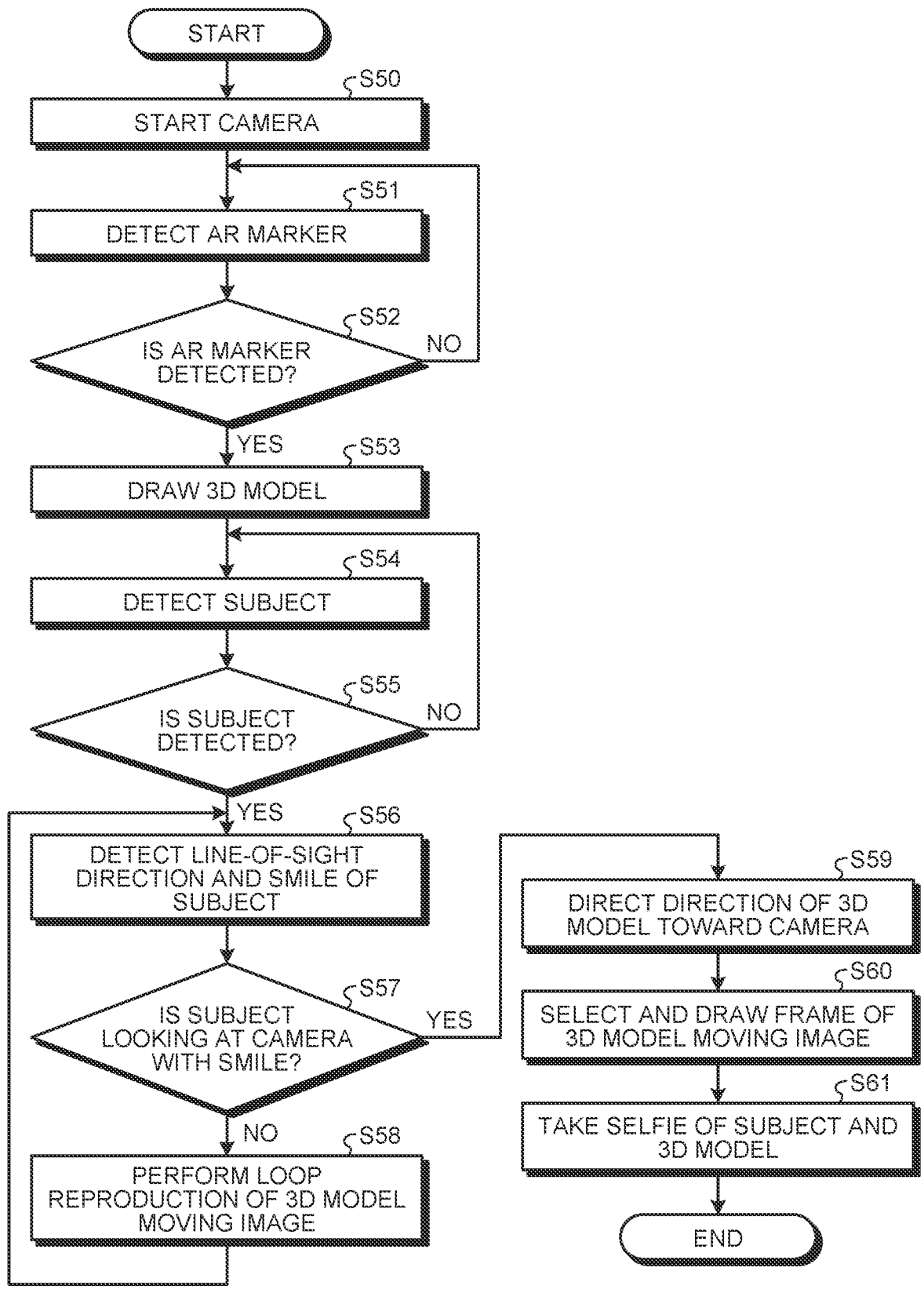
FIG. 13 is a flowchart illustrating an example of a flow of processing performed by the mobile terminal according to the third embodiment.

FIG. 13 is a flowchart illustrating an example of a flow of processing performed by the mobile terminal according to the third embodiment. Hereinafter, the flow of the processing will be described in order.

Description of a flow of processing from steps S50 to S55 in FIG. 13 will be omitted because the flow is the same as that of the processing from steps S10 to S15 in FIG. 9 described in the first embodiment.

In a case where it is determined in step S55 that the subject 92 has been detected (step S55: Yes), the line-of-sight direction detection unit 53b detects the line-of-sight direction E of the subject 92. Then, the smile detection unit 53c determines whether or not the subject 92 smiles (step S56).

Then, in a case where it is determined in step S56 that the subject 92 smiles, the line-of-sight direction detection unit 53b determines whether or not the line-of-sight direction E of the subject 92 faces the camera 84 (step S57). In a case where it is determined that the subject 92 smiles and the line-of-sight direction E faces the camera 84 (step S57: Yes), the process proceeds to step S59. Meanwhile, in a case where it is determined that the subject 92 does not smile and the line-of-sight direction E does not face the camera 84 (step S57: No), the process proceeds to step S58.

In a case where the determination result is No in step S57, the 3D model frame selection unit 54a selects a moving image frame of the 3D model 90M from the 3D models M stored in the storage unit 38. Then, the 3D model drawing direction control unit 54b performs loop reproduction of the moving image frame selected by the 3D model frame selection unit 54a (step S58). Thereafter, the process returns to step S56.

Meanwhile, in a case where the determination result is Yes in step S57, the 3D model drawing direction control unit 54b directs the drawing position of the 3D model 90M toward the camera 84 (step S59).

Next, the 3D model drawing direction control unit 54b draws the 3D model 90N whose eyes are opened and line-of-sight direction F faces the camera 84 and having a smile, which is selected by the 3D model frame selection unit 54a, at the drawing position set in step S59 (step S60).

Then, the image capturing/video recording processing unit 51b takes a selfie while both the subject 92 and the 3D model 90N are looking at the camera (step S61).

3-3. Effects of Third Embodiment

As described above, according to the mobile terminal 80 of the third embodiment, the subject feature detection unit 53 (detection unit) detects a smile (facial expression) serving as a feature of the subject 92. Then, in a case where it is determined that the facial expression of the subject 92 is a smile, the display control unit 54 (control unit) changes the direction of the 3D model 90M toward the camera 84, that is, the direction from which the captured image I has been captured.

Therefore, it is possible to take a selfie while both the subject 92 and the 3D model 90N are looking at the camera with a smile.

4. Fourth Embodiment

A fourth embodiment of the present disclosure is an example of the mobile terminal 80 (information processing device) having a function of taking a selfie after automatically correcting brightness and a skin color of the 3D model 90M in accordance with an image capturing environment of the subject 92. That is, the mobile terminal 80 of this embodiment changes the display mode (brightness) of the 3D model 90M in accordance with brightness (e.g., brightness of skin) serving as a feature of the subject 92.

Description of a hardware configuration of the mobile terminal 80 of this embodiment will be omitted because the configuration is the same as that of the mobile terminal 80 described in the first embodiment. Note that a control program stored in the storage unit 38 is different from the control program P1 (see FIG. 5) in order to exert a function unique to this embodiment.

4-1. Functional Configuration of Mobile Terminal

Figure 14:
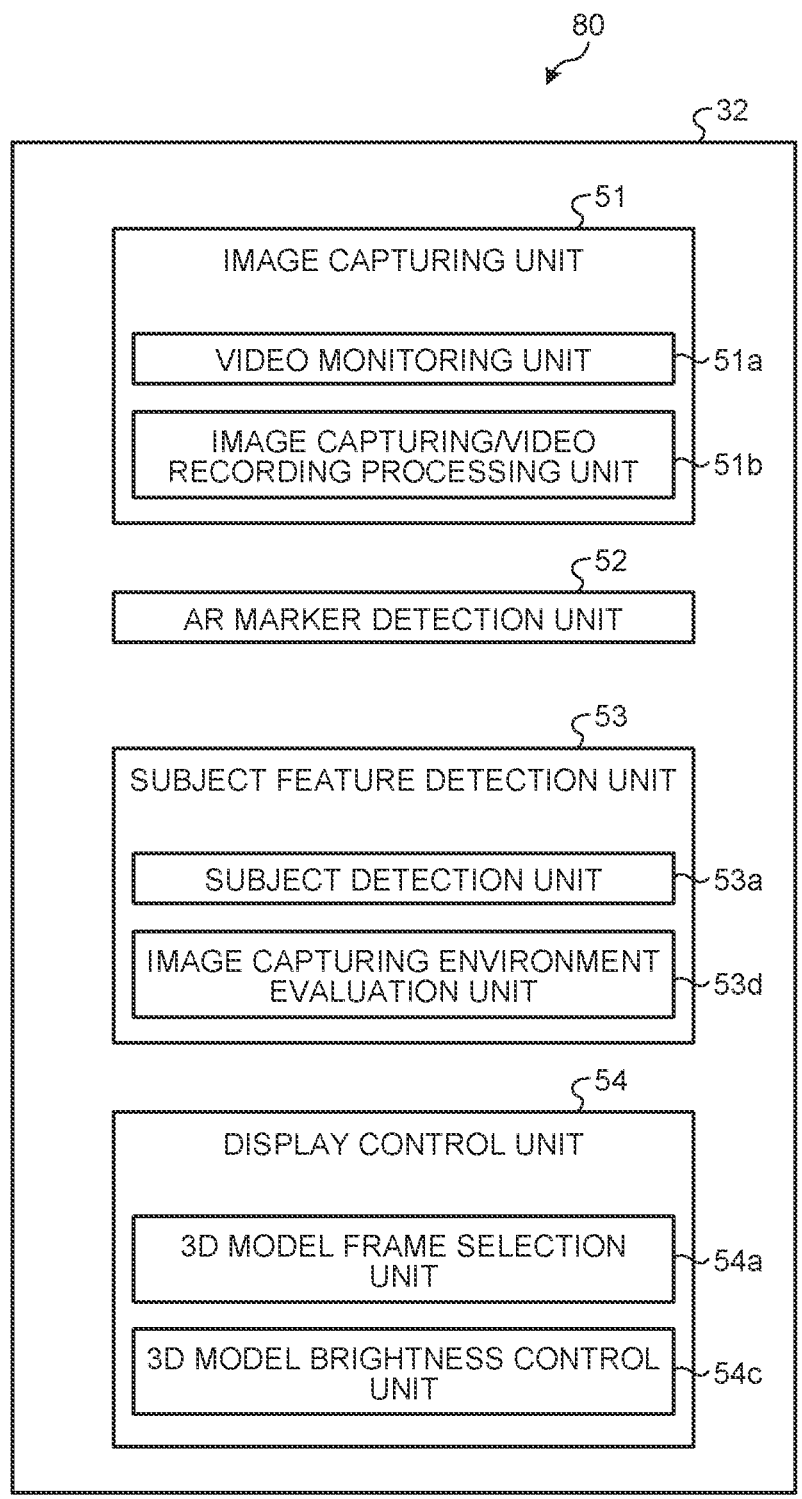
FIG. 14 is a functional block diagram illustrating an example of a functional configuration of a mobile terminal according to a fourth embodiment.

FIG. 14 is a functional block diagram illustrating an example of a functional configuration of the mobile terminal according to the fourth embodiment. The mobile terminal 80 of the fourth embodiment has a functional configuration obtained by replacing some functions with the functions of the mobile terminal 80 (see FIG. 6) of the first embodiment. Hereinafter, only differences in functional configuration from the mobile terminal 80 of the first embodiment will be described.

The subject feature detection unit 53 includes an image capturing environment evaluation unit 53d instead of the line-of-sight direction detection unit 53b.

The image capturing environment evaluation unit 53d measures brightness of the image capturing environment of the captured image I and brightness of the subject 92 appearing in the captured image I. For example, the image capturing environment evaluation unit 53d divides the captured image I into regions, i.e., a region of the subject 92 and a region other than the subject 92, and obtains average brightness of each region. The image capturing environment evaluation unit 53d may measure a skin tone of the subject 92.

The display control unit 54 includes a 3D model brightness control unit 54c instead of the 3D model drawing direction control unit 54b.

The 3D model brightness control unit 54c corrects brightness of a texture of the 3D model 90M. For example, the 3D model brightness control unit 54c compares the brightness of the image capturing environment measured by the image capturing environment evaluation unit 53d with brightness of an environment in which the 3D model 90M has been generated. Then, in a case where the brightness of the environment in which the 3D model 90M has been generated is brighter than the brightness of the image capturing environment measured by the image capturing environment evaluation unit 53d, the texture of the 3D model 90M is corrected to be dark. Meanwhile, in a case where the brightness of the environment in which the 3D model 90M has been generated is darker than the brightness of the image capturing environment measured by the image capturing environment evaluation unit 53d, the texture of the 3D model 90M is corrected to be bright.

The 3D model brightness control unit 54c may correct the texture of the 3D model 90M on the basis of the brightness of skin and the skin tone of the subject 92 appearing in the captured image I so that brightness of skin and a skin tone of the 3D model 90M are the same degrees as the brightness of skin and skin tone of the subject 92.

4-2. Flow of Processing Performed by Mobile Terminal

Figure 15:
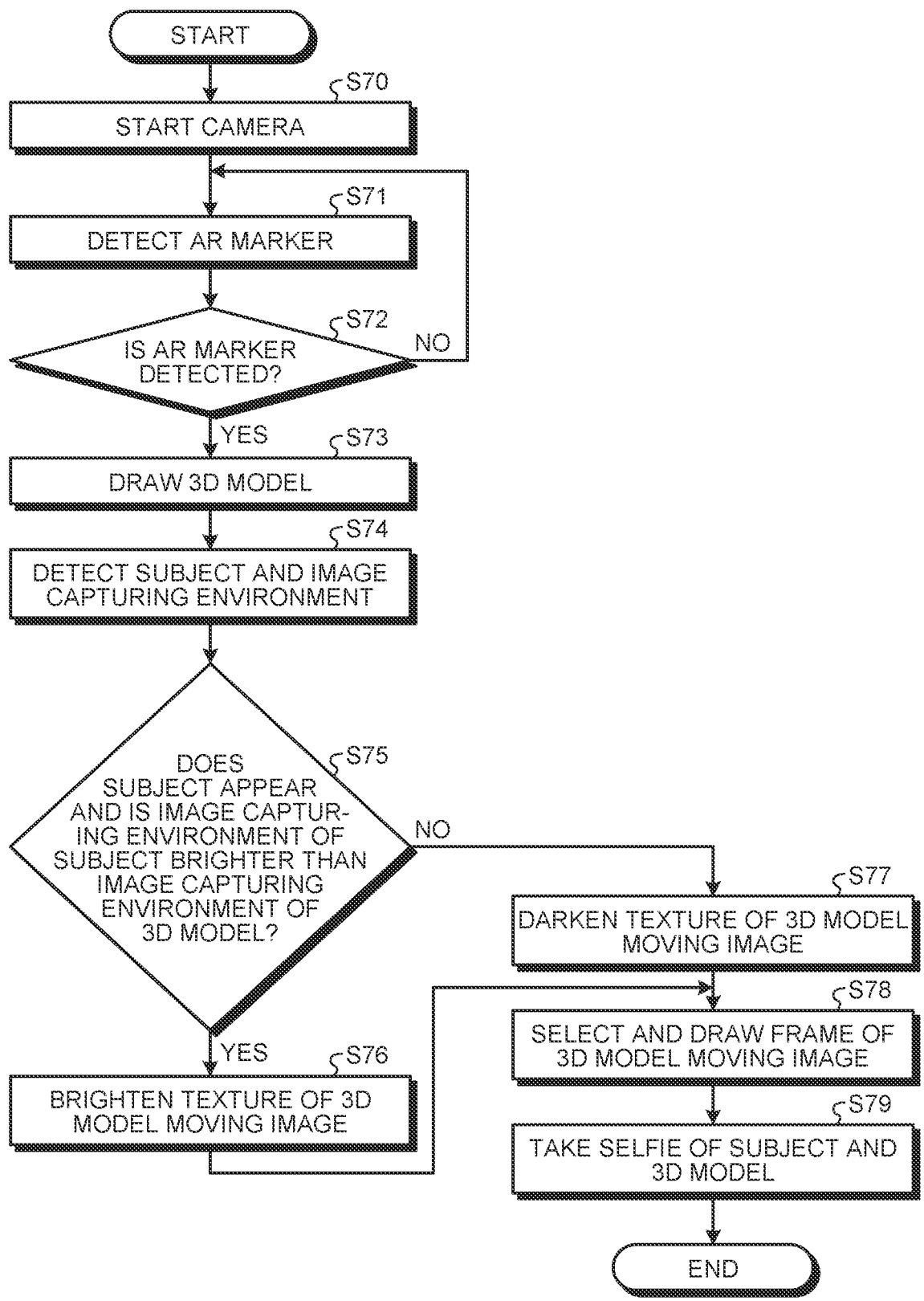
FIG. 15 is a flowchart illustrating an example of a flow of processing performed by the mobile terminal according to the fourth embodiment.

FIG. 15 is a flowchart illustrating an example of a flow of processing performed by the mobile terminal according to the fourth embodiment. Hereinafter, the flow of the processing will be described in order.

Description of a flow of processing from steps S70 to S73 in FIG. 15 will be omitted because the flow is the same as that of the processing from steps S10 to S13 in FIG. 9 described in the first embodiment.

After step S73, the subject detection unit 53a detects the subject 92 from the captured image I. Then, the image capturing environment evaluation unit 53d detects the brightness of the image capturing environment of the captured image I and the brightness of the subject 92 appearing in the captured image I (step S74).

Next, the image capturing environment evaluation unit 53d determines whether or not the subject 92 appears in the captured image I and whether or not the brightness of the image capturing environment is brighter than an image capturing environment of the 3D model 90M (step S75). In a case where it is determined that the above conditions are satisfied (step S75: Yes), the process proceeds to step S76. Meanwhile, in a case where it is determined that the conditions are not satisfied (step S75: No), the process proceeds to step S77.

In a case where the determination result is Yes in step S75, the 3D model brightness control unit 54c corrects the texture of the 3D model 90M to a brighter texture (step S76). Thereafter, the process proceeds to step S78.

Meanwhile, in a case where the determination result is No in step S75, the 3D model brightness control unit 54c corrects the texture of the 3D model 90M to a darker texture (step S77).

After step S76 or S77, the 3D model drawing direction control unit 54b draws, in the captured image I, the 3D model 90N obtained by subjecting the 3D model 90M selected by the 3D model frame selection unit 54a to the texture brightness correction corresponding to step S76 or S77 (step S78).

Then, the image capturing/video recording processing unit 51b takes a selfie while both the subject 92 and the 3D model 90N appear (step S79).

4-3. Effects of Fourth Embodiment

As described above, according to the mobile terminal 80 of the fourth embodiment, the subject feature detection unit 53 (detection unit) detects the brightness serving as the feature of the subject 92. Then, the display control unit 54 (control unit) changes the brightness of the 3D model 90M in accordance with the brightness of the subject 92.

Therefore, it is possible to take a selfie together with the 3D model 90N whose brightness of the texture has been corrected in accordance with the tone of the face of the subject 92.

5. Fifth Embodiment

A fifth embodiment of the present disclosure is an example of the mobile terminal 80 (information processing device) having a function of correcting the drawing position of the 3D model 90M (distance from the camera 84) in accordance with the position of the subject 92 (distance from the camera 84) and taking a selfie while both the subject 92 and the 3D model 90M are in focus. That is, the mobile terminal 80 of this embodiment changes the display mode (drawing position) of the 3D model 90M in accordance with the position (distance from the camera 84) serving as a feature of the subject 92.

Description of a hardware configuration of the mobile terminal 80 of this embodiment will be omitted because the configuration is the same as that of the mobile terminal 80 described in the first embodiment. Note that a control program stored in the storage unit 38 is different from the control program P1 (see FIG. 5) in order to exert a function unique to this embodiment.

5-1. Functional Configuration of Mobile Terminal

Figure 16:
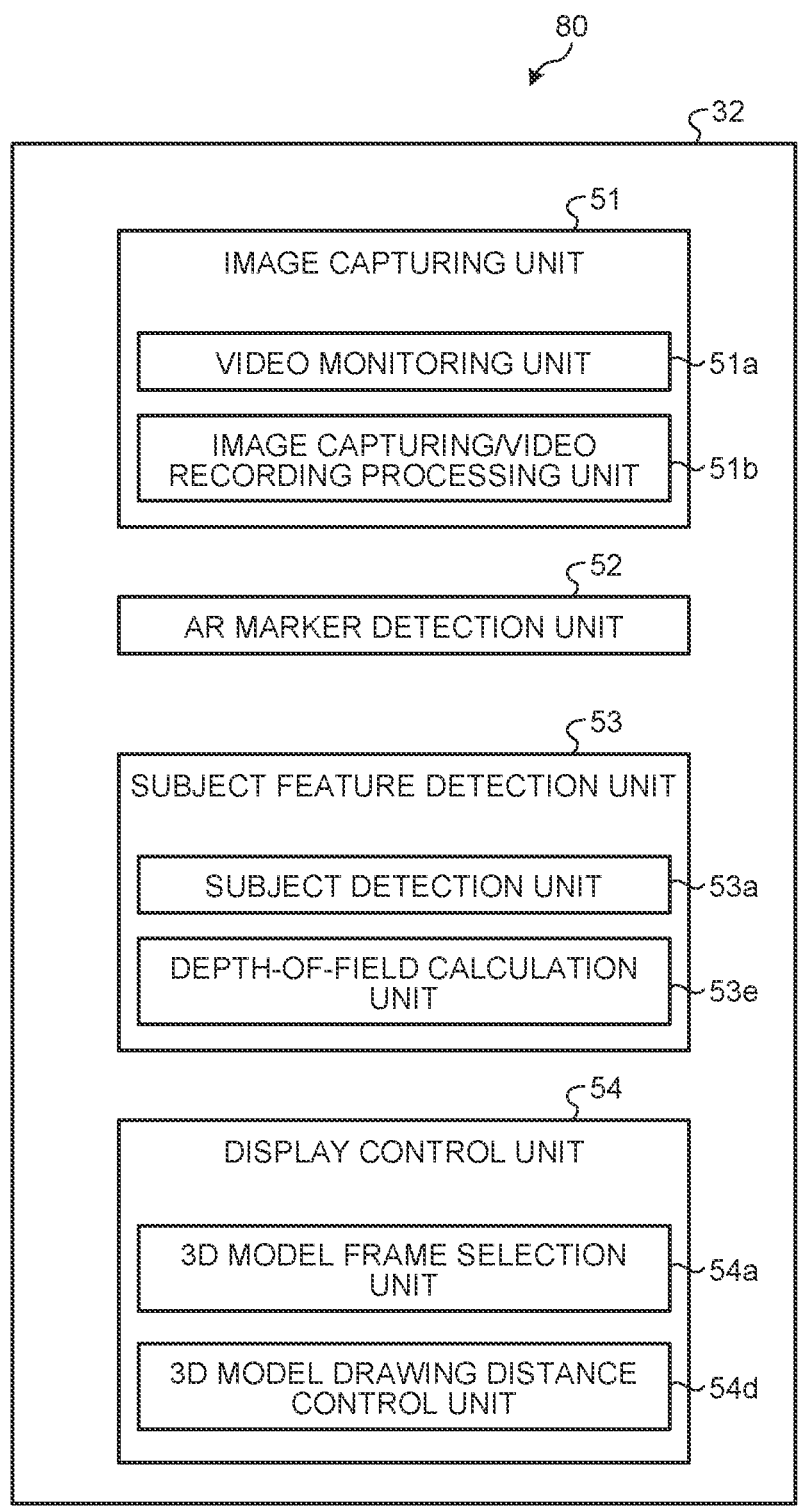
FIG. 16 is a functional block diagram illustrating an example of a functional configuration of a mobile terminal according to a fifth embodiment.

FIG. 16 is a functional block diagram illustrating an example of a functional configuration of the mobile terminal according to the fifth embodiment. The mobile terminal 80 of the fifth embodiment has a functional configuration obtained by replacing some functions with the functions of the mobile terminal 80 (see FIG. 6) of the first embodiment. Hereinafter, only differences in functional configuration from the mobile terminal 80 of the first embodiment will be described.

The subject feature detection unit 53 includes a depth-of-field calculation unit 53e instead of the line-of-sight direction detection unit 53b.

The depth-of-field calculation unit 53e calculates distances from the camera 84 to the subject 92 and the AR marker 85 appearing in the captured image I. The depth-of-field calculation unit 53e also calculates a depth of field of the captured image I. The depth-of-field calculation unit 53e calculates the depth of field from a diaphragm (F value) of the camera 84, a focal length of a lens, and the distance from the subject 92.

The display control unit 54 includes a 3D model drawing distance control unit 54d instead of the 3D model drawing direction control unit 54b.

The 3D model drawing distance control unit 54d controls the drawing position of the 3D model 90M (a distance from the camera 84 to a position at which the 3D model 90M is drawn). More specifically, the 3D model drawing distance control unit 54d controls the drawing position of the 3D model 90M so that the 3D model 90M is located at the same depth of field as the subject 92.

5-2. Flow of Processing Performed by Mobile Terminal

Figure 17:
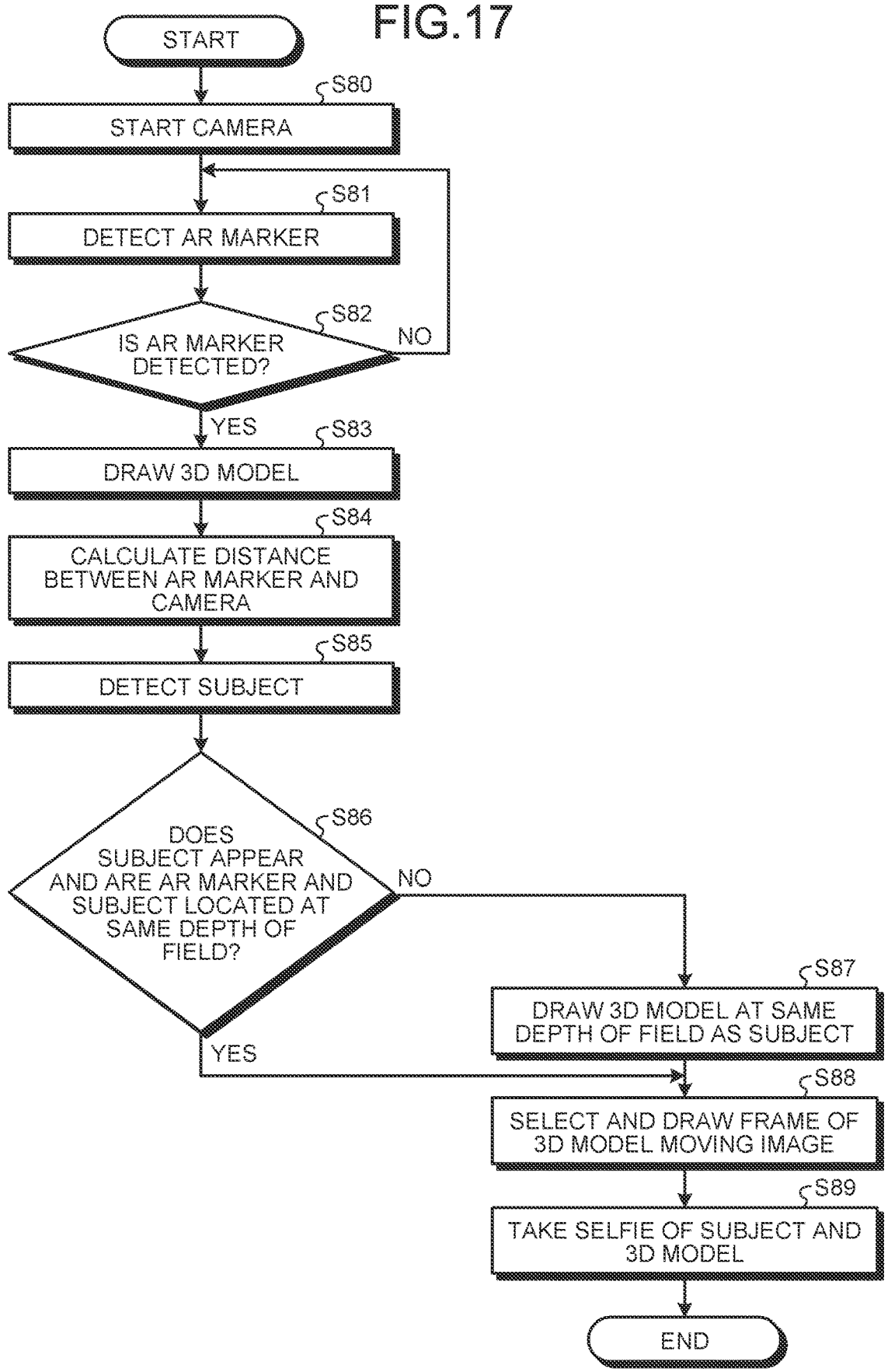
FIG. 17 is a flowchart illustrating an example of a flow of processing performed by the mobile terminal according to the fifth embodiment.

FIG. 17 is a flowchart illustrating an example of a flow of processing performed by the mobile terminal according to the fifth embodiment. Hereinafter, the flow of the processing will be described in order.

Description of a flow of processing from steps S80 to S83 in FIG. 17 will be omitted because the flow is the same as that of the processing from steps S10 to S13 in FIG. 9 described in the first embodiment.

After step S83, the depth-of-field calculation unit 53e calculates the distance from the camera 84 to the AR marker 85 appearing in the captured image I (step S84).

Next, the subject detection unit 53a detects the subject 92 from the captured image I (step S85). At this time, the depth-of-field calculation unit 53e calculates the distance from the camera 84 to the subject 92.

The depth-of-field calculation unit 53e determines whether or not the subject 92 appears in the captured image I and whether or not the AR marker 85 and the subject 92 are located at the same depth of field (step S86). In a case where it is determined that the above conditions are satisfied (step S86: Yes), the process proceeds to step S88. Meanwhile, in a case where it is determined that the conditions are not satisfied (step S86: No), the process proceeds to step S87. Note that whether or not the AR marker 85 and the subject 92 are located at the same depth of field can be determined on the basis of whether or not a distance from the AR marker 85 to the subject 92 calculated on the basis of the results of steps S84 and S85 is within the depth of field calculated from an image capturing condition of the subject 92.

In a case where the determination result is No in step S86, that is, in a case where the AR marker 85 and the subject 92 are not located at the same depth of field, the 3D model drawing distance control unit 54d draws the drawing position of the 3D model 90M in the captured image I within a distance at which the 3D model 90M is located at the same depth of field as the subject 92 (step S87).

Next, the 3D model drawing direction control unit 54b draws the 3D model 90M selected by the 3D model frame selection unit 54a at the drawing position set in step S87 (step S88).

Then, the image capturing/video recording processing unit 51b takes a selfie while the subject 92 and the 3D model 90M are being located at the same depth of field (step S89).

5-3. Effects of Fifth Embodiment

As described above, according to the mobile terminal 80 of the fifth embodiment, the subject feature detection unit 53 (detection unit) detects the distance from the camera 84 to the subject 92, which is the feature of the subject 92. Then, the display control unit 54 (control unit) changes the distance from the 3D model 90M so that the 3D model 90M and the subject 92 are located at the depth of field of the captured image I.

Therefore, it is possible to take a selfie while both the subject 92 and the 3D model 90M are in focus.

6. Sixth Embodiment

A sixth embodiment of the present disclosure is an example of the mobile terminal 80 (information processing device) having a function of correcting the drawing position of the 3D model 90M in accordance with the position of the subject 92 in the captured image I and taking a selfie while the subject 92 and the 3D model 90M are not overlapping. That is, the mobile terminal 80 of this embodiment changes the display mode (drawing position) of the 3D model 90M in accordance with the position serving as a feature of the subject 92.

Description of a hardware configuration of the mobile terminal 80 of this embodiment will be omitted because the configuration is the same as that of the mobile terminal 80 described in the first embodiment. Note that a control program stored in the storage unit 38 is different from the control program P1 (see FIG. 5) in order to exert a function unique to this embodiment.

6-1. Functional Configuration of Mobile Terminal

Figure 18:
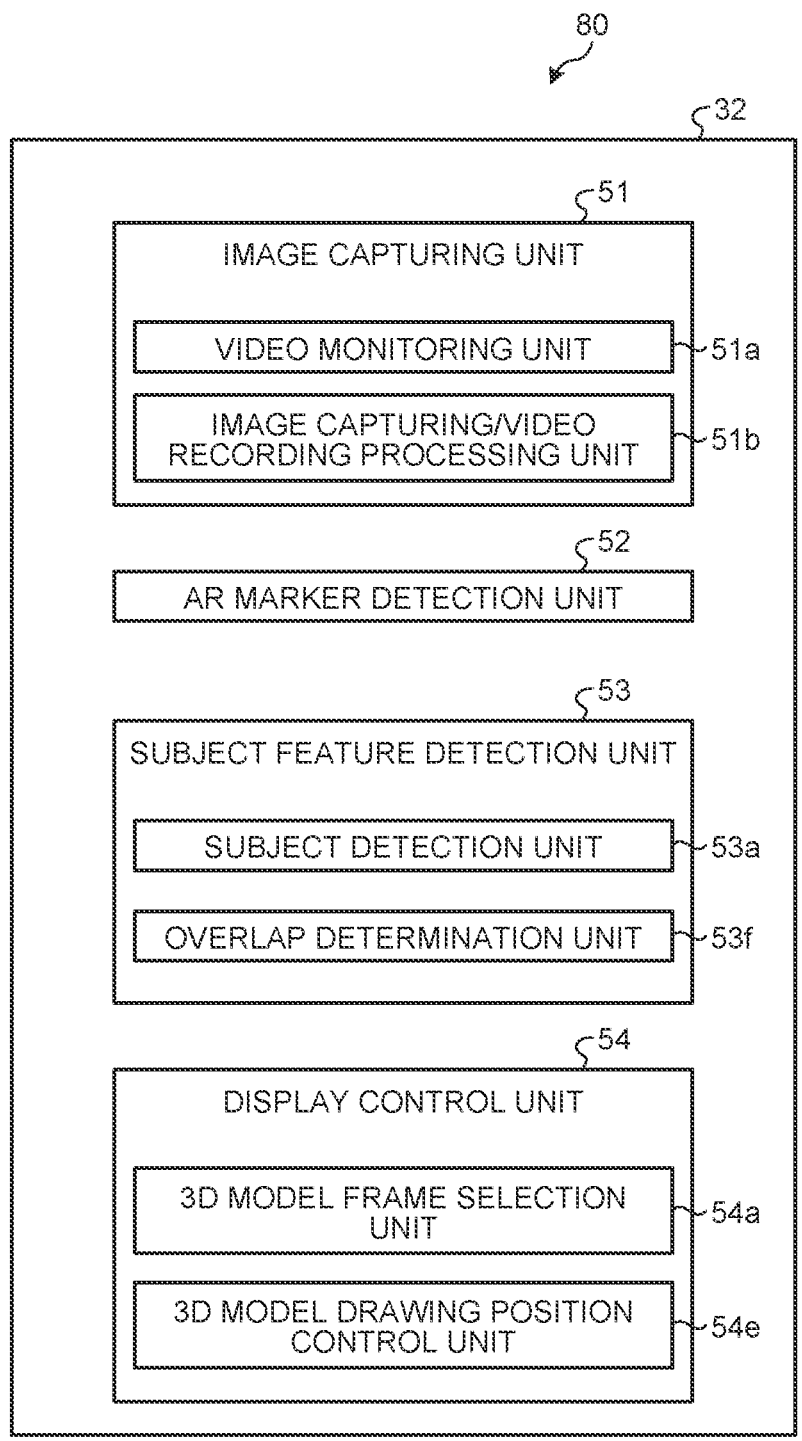
FIG. 18 is a functional block diagram illustrating an example of a functional configuration of a mobile terminal according to a sixth embodiment.

FIG. 18 is a functional block diagram illustrating an example of a functional configuration of the mobile terminal according to the sixth embodiment. The mobile terminal 80 of the sixth embodiment has a functional configuration obtained by replacing some functions with the functions of the mobile terminal 80 (see FIG. 6) of the first embodiment. Hereinafter, only differences in functional configuration from the mobile terminal 80 of the first embodiment will be described.

The subject feature detection unit 53 includes an overlap determination unit 53f instead of the line-of-sight direction detection unit 53b.

The overlap determination unit 53f determines whether or not the subject 92 and the AR marker 85 overlap in the captured image I. Specifically, the overlap determination unit 53f detects the position of the subject 92 in the captured image I. Then, the overlap determination unit 53f compares the position of the detected subject 92 with a position of the AR marker 85 detected by the AR marker detection unit 52. In a case where the subject 92 and the AR marker 85 overlap, the overlap determination unit 53f predicts that the subject 92 and the 3D model 90M will overlap when the 3D model 90M is drawn at a position corresponding to the AR marker 85 in the captured image I.

The display control unit 54 includes a 3D model drawing position control unit 54e instead of the 3D model drawing direction control unit 54b.

In a case where the overlap determination unit 53f predicts that the subject 92 and the 3D model 90M will overlap, the 3D model drawing position control unit 54e draws the 3D model 90M at a position that does not overlap with the position of the subject 92.

6-2. Flow of Processing Performed by Mobile Terminal

Figure 19:
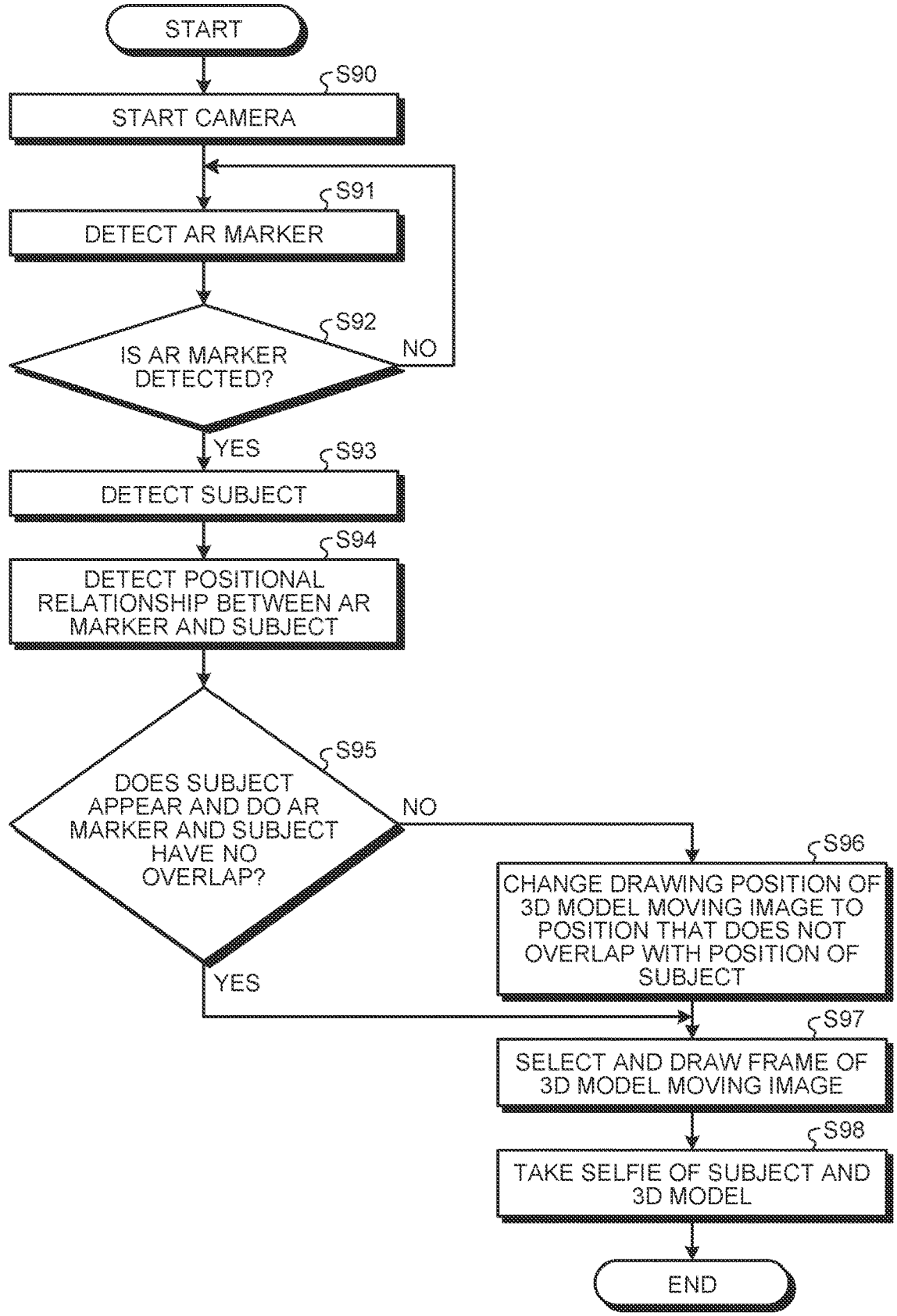
FIG. 19 is a flowchart illustrating an example of a flow of processing performed by the mobile terminal according to the sixth embodiment.

FIG. 19 is a flowchart illustrating an example of a flow of processing performed by the mobile terminal according to the sixth embodiment. Hereinafter, the flow of the processing will be described in order.

Description of a flow of processing from steps S90 to S92 in FIG. 19 will be omitted because the flow is the same as that of the processing from steps S10 to S12 in FIG. 9 described in the first embodiment.

In a case where it is determined in step S92 that the AR marker 85 has been detected (step S92: Yes), the subject detection unit 53a detects the subject 92 from the captured image I (step S93).

Next, the overlap determination unit 53f detects a positional relationship between the AR marker 85 and the subject 92 (step S94).

Further, the overlap determination unit 53f determines whether or not the subject 92 appears in the captured image I and whether or not the AR marker 85 and the subject 92 have no overlap (step S95). In a case where it is determined that the above conditions are satisfied (step S95: Yes), the process proceeds to step S97. Meanwhile, in a case where it is determined that the conditions are not satisfied (step S95: No), the overlap determination unit 53f predicts that the subject 92 and the 3D model 90M will overlap when the 3D model 90M is drawn at the position corresponding to the AR marker 85, and processing in step S96 is performed.

In a case where the determination result is No in step S95, the 3D model drawing position control unit 54e changes the drawing position of the 3D model 90M that is supposed to be drawn at the position corresponding to the AR marker 85 to a position that does not overlap with the position of the subject 92 (e.g., a position distant from the subject 92) (step S96).

Then, the 3D model drawing position control unit 54e draws the selected 3D model 90M at the position changed in step S96. Meanwhile, in a case where the result of the determination is Yes in step S95, the 3D model drawing position control unit 54e draws the selected 3D model 90M at the position corresponding to the AR marker 85 (step S97).

Then, the image capturing/video recording processing unit 51b takes a selfie while the subject 92 and the 3D model 90M are not overlapping (step S98).

6-3. Effects of Sixth Embodiment

As described above, according to the mobile terminal 80 of the sixth embodiment, the subject feature detection unit 53 (detection unit) detects the position of the subject 92 in the captured image I, which serves as the feature of the subject 92. Then, in a case where the position of the subject 92 and the position of the 3D model 90M are predicted to overlap, the display control unit 54 (control unit) changes the display position of the 3D model 90M to a position that does not overlap with the position of the subject 92.

This makes it possible to take a selfie while the subject 92 and the 3D model 90M are not overlapping.

7. Seventh Embodiment

A seventh embodiment of the present disclosure is an example of the mobile terminal 80 (information processing device) having a function of correcting a size and scale of the 3D model 90M in accordance with a size of the subject 92 in the captured image I and taking a selfie so that the subject 92 and the 3D model 90M look the same height or so that a face of the subject 92 looks smaller than that of the 3D model 90M. That is, the mobile terminal 80 of this embodiment changes the display mode (size and scale) of the 3D model 90M in accordance with the size serving as a feature of the subject 92.

Description of a hardware configuration of the mobile terminal 80 of this embodiment will be omitted because the configuration is the same as that of the mobile terminal 80 described in the first embodiment. Note that a control program stored in the storage unit 38 is different from the control program P1 (see FIG. 5) in order to exert a function unique to this embodiment.

7-1. Functional Configuration of Mobile Terminal

Figure 20:
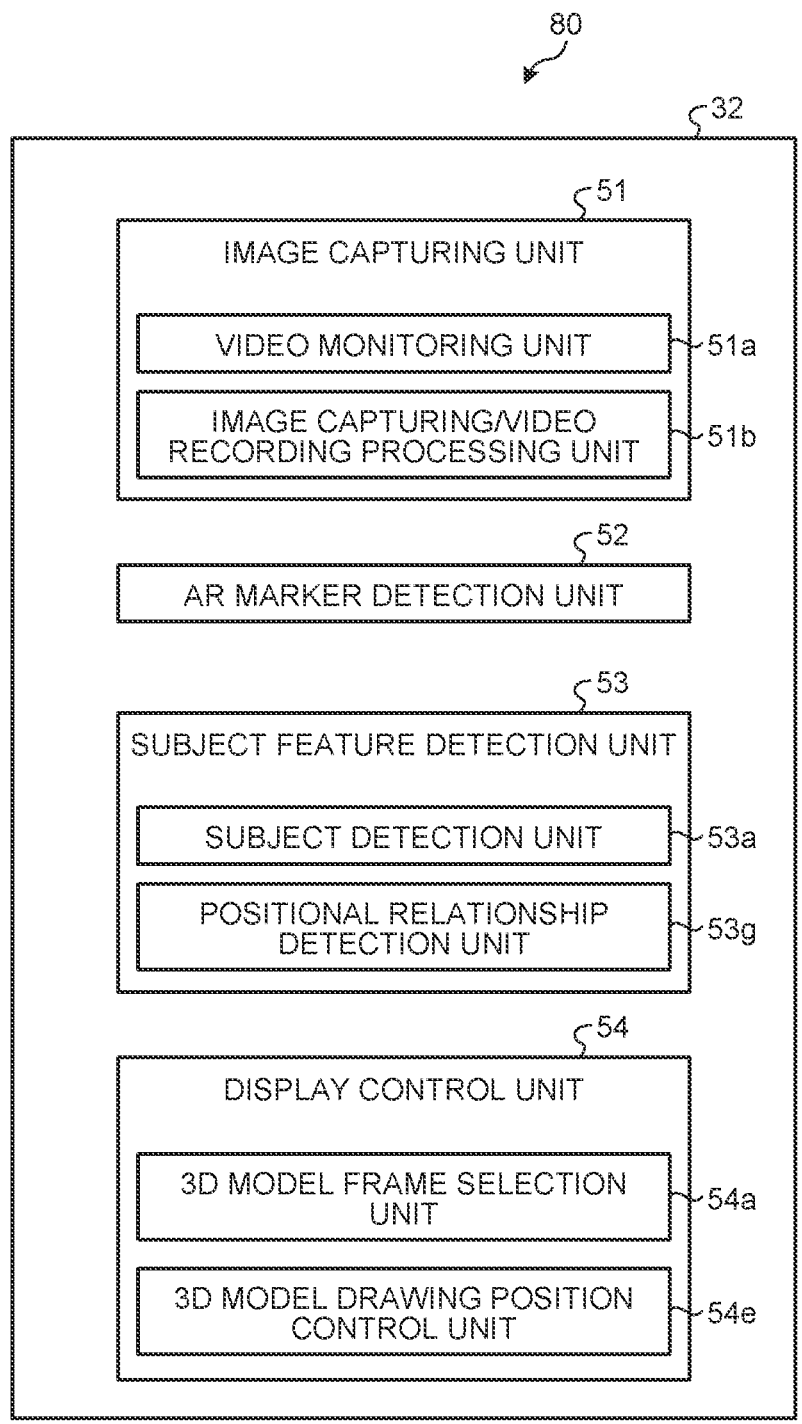
FIG. 20 is a functional block diagram illustrating an example of a functional configuration of a mobile terminal according to a seventh embodiment.

FIG. 20 is a functional block diagram illustrating an example of a functional configuration of the mobile terminal according to the sixth embodiment. The mobile terminal 80 of the seventh embodiment has a functional configuration obtained by replacing some functions with the functions of the mobile terminal 80 (see FIG. 6) of the first embodiment. Hereinafter, only differences in functional configuration from the mobile terminal 80 of the first embodiment will be described.

The subject feature detection unit 53 includes a positional relationship detection unit 53g instead of the line-of-sight direction detection unit 53b.

The positional relationship detection unit 53g detects a positional relationship between the position of the AR marker 85 detected by the AR marker detection unit 52 and the position of the subject 92 detected by the subject detection unit 53a. The positional relationship detection unit 53g also detects a size of the face of the subject 92 accounting for an angle of view of the camera 84.

The display control unit 54 includes a 3D model drawing position control unit 54e instead of the 3D model drawing direction control unit 54b.

The 3D model drawing position control unit 54e sets the scale and drawing position of the 3D model 90M when the 3D model 90M is drawn in the captured image I. Specifically, the drawing position of the 3D model 90M is set to match the height of the subject 92. The drawing position of the 3D model 90M is also set so that a position of the face of the subject 92 and a position of the face of the 3D model 90M are at the same height. As a matter of course, the drawing position may be set on the basis of conditions other than the above conditions.

7-2. Flow of Processing Performed by Mobile Terminal

Figure 21:
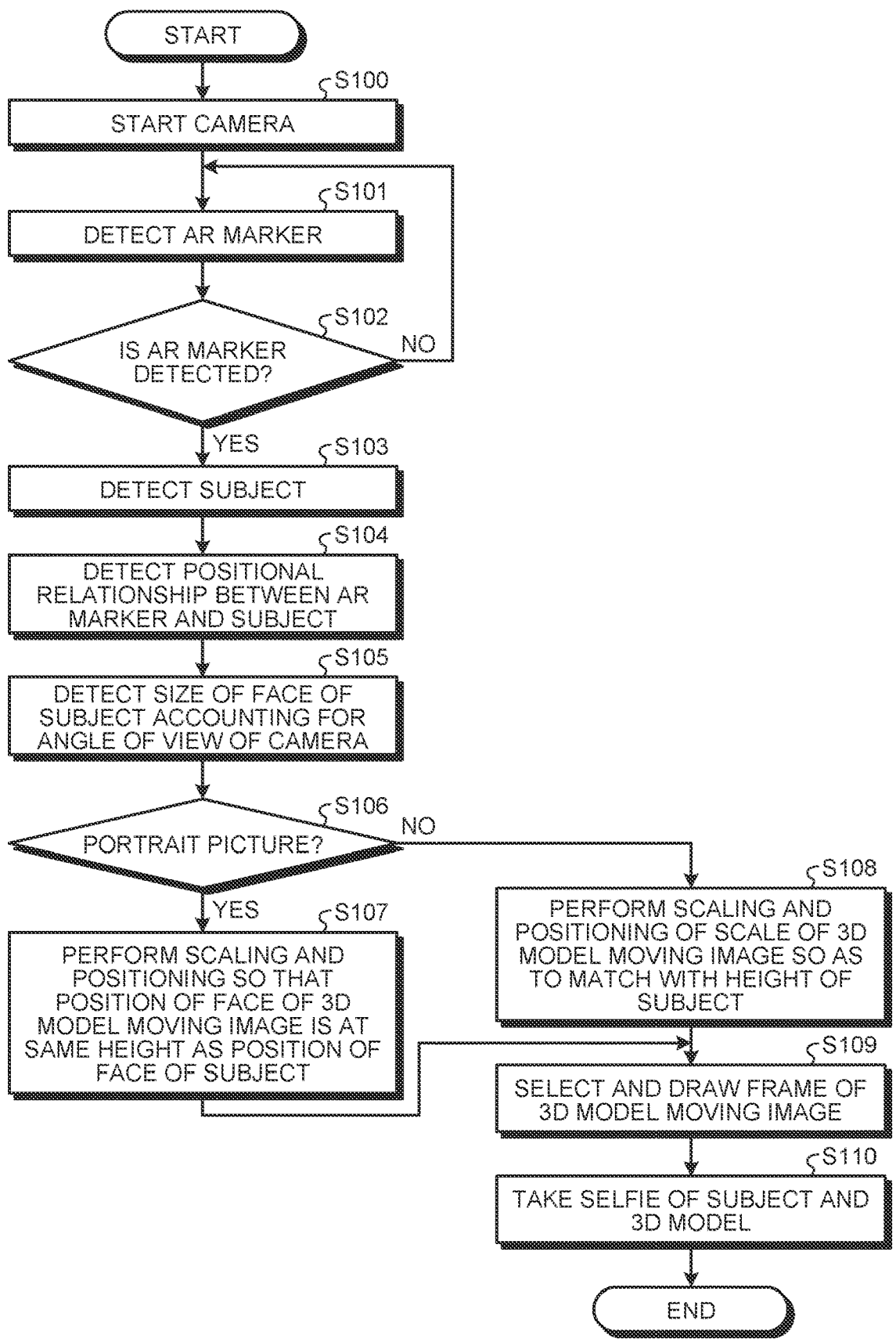
FIG. 21 is a flowchart illustrating an example of a flow of processing performed by the mobile terminal according to the seventh embodiment.

FIG. 21 is a flowchart illustrating an example of a flow of processing performed by the mobile terminal according to the seventh embodiment. Hereinafter, the flow of the processing will be described in order.

Description of a flow of processing from steps S100 to S102 in FIG. 21 will be omitted because the flow is the same as that of the processing from steps S10 to S12 in FIG. 9 described in the first embodiment.

In a case where it is determined in step S102 that the AR marker 85 has been detected (step S102: Yes), the subject detection unit 53a detects the subject 92 from the captured image I (step S103).

Next, the positional relationship detection unit 53g detects the positional relationship between the AR marker 85 and the subject 92 (step S104).

The positional relationship detection unit 53g further detects the size of the face of the subject 92 accounting for the angle of view of the camera 84 (step S105).

Then, the positional relationship detection unit 53g determines whether or not the captured image I is a portrait picture in which an upper body of the subject 92 appears (step S106). I a case where it is determined that the captured image is a portrait picture (step S106: Yes), the process proceeds to step S107. Meanwhile, in a case where it is determined that the captured image is not a portrait picture (step S106: No), the process proceeds to step S108.

In a case where the determination result is Yes in step S106, the 3D model drawing position control unit 54e sets the scale and drawing position for drawing the 3D model 90M so that a position of the face of the 3D model moving image is at the same height as the position of the face of the subject 92 (step S107). Thereafter, the process proceeds to step S109.

Meanwhile, in a case where the determination result is No in step S106, the 3D model drawing position control unit 54e sets the scale and drawing position of the 3D model moving image so as to match with the height of the subject 92 (step S108).

Then, the 3D model drawing position control unit 54e draws the selected 3D model 90M in the captured image I under the condition set in step S107 or S108 (step S109).

Then, the image capturing/video recording processing unit 51b takes a selfie while the subject 92 and the 3D model 90M are arranged in well balance (step S110).

7-3. Effects of Seventh Embodiment

As described above, according to the mobile terminal 80 of the seventh embodiment, the subject feature detection unit 53 (detection unit) detects the position and size of the subject 92 in the captured image I, which serve as the features of the subject 92. Then, the display control unit 54 (control unit) adjusts a display position and size of the 3D model 90M in accordance with the position and size of the subject 92.

Therefore, it is possible to take a selfie while the subject 92 and the 3D model 90M are being arranged in well balance.

Note that each embodiment described above may have functions of a plurality of different embodiments. In this case, the mobile terminal 80 includes all the functional configurations of the plurality of embodiments.

8. Eighth Embodiment

The eighth embodiment of the present disclosure is an example of an information processing device 81a having a function of forming a virtual space in a captured image captured by the camera 84 and displaying an avatar of the subject 92 and the 3D model 90M in the virtual space. The avatar of the subject 92 displayed in the captured image can move in the virtual space in response to an operation from the subject 92.

8-1. Overview of Information Processing Device

FIG. 22 illustrates an overview of the information processing device according to the eighth embodiment.

The camera 84 connected to the information processing device 81a captures an image of the user who is the subject 92 and generates a captured image Ia (virtual image). The generated captured image Ia is wirelessly transmitted and is displayed on a head mounted display 89 (HMD) worn by the subject 92. An avatar 92a (first avatar) that is a virtual self of the subject 92 is displayed in the captured image Ia displayed on the head mounted display 89, and the 3D model 90M described in each embodiment of the present disclosure is also displayed while being superimposed on the captured image Ia. The avatar 92a is a full CG moving image. The head mounted display 89 has not only a function of detecting a motion of a head and the line-of-sight direction of the subject 92 but also a sound output function of transmitting sound information output by the information processing device 81a to the subject 92.

The subject 92 further wears a controller 88 having a function of an acceleration sensor that detects a position, posture, motion, and the like of the subject 92 himself/herself, and a function of an operation switch that issues an operation instruction to the information processing device. The line-of-sight direction and motion of the head of the subject 92, which are detected by the head mounted display 89, and the motion of the subject 92 and operation information, which are detected by the controller 88, are wirelessly transmitted to the information processing device 81a and are reflected in a motion of the avatar 92a and an operation of the information processing device 81a. That is, the user who is the subject 92 can freely move around the virtual space formed in the captured image Ia while viewing the captured image Ia. That is, the motion of the subject 92 is reflected in the motion of the avatar 92a.

In particular, in the information processing device 81a of this embodiment, the avatar 92a has a function of capturing an image by using a virtual camera 84V in the virtual space. That is, when the subject 92 issues an instruction to operate the virtual camera 84V via the controller 88, the avatar 92a takes out the virtual camera 84V and captures an image in such a direction in the virtual space as instructed by the subject 92.

When a line-of-sight direction E of the avatar 92a appearing in the captured image Ia captured by the virtual camera 84V faces the virtual camera 84V, the 3D model 90M is changed to the 3D model 90N whose line-of-sight direction F faces the virtual camera 84V. Then, the information processing device 81a takes a selfie while both the avatar 92a and the 3D model 90N are looking at the virtual camera 84V.

A hardware configuration of the information processing device 81a is obtained by replacing the liquid crystal display 16 with the head mounted display 89 and replacing the touchscreen 14 with the controller 88 (not illustrated) in the hardware configuration (FIG. 5) of the mobile terminal 80 described in the first embodiment. A CPU 32 of the information processing device 81a is connected to the head mounted display 89 and the controller 88 by wireless or wired communication.

8-2. Functional Configuration of Information Processing Device

Figure 23:
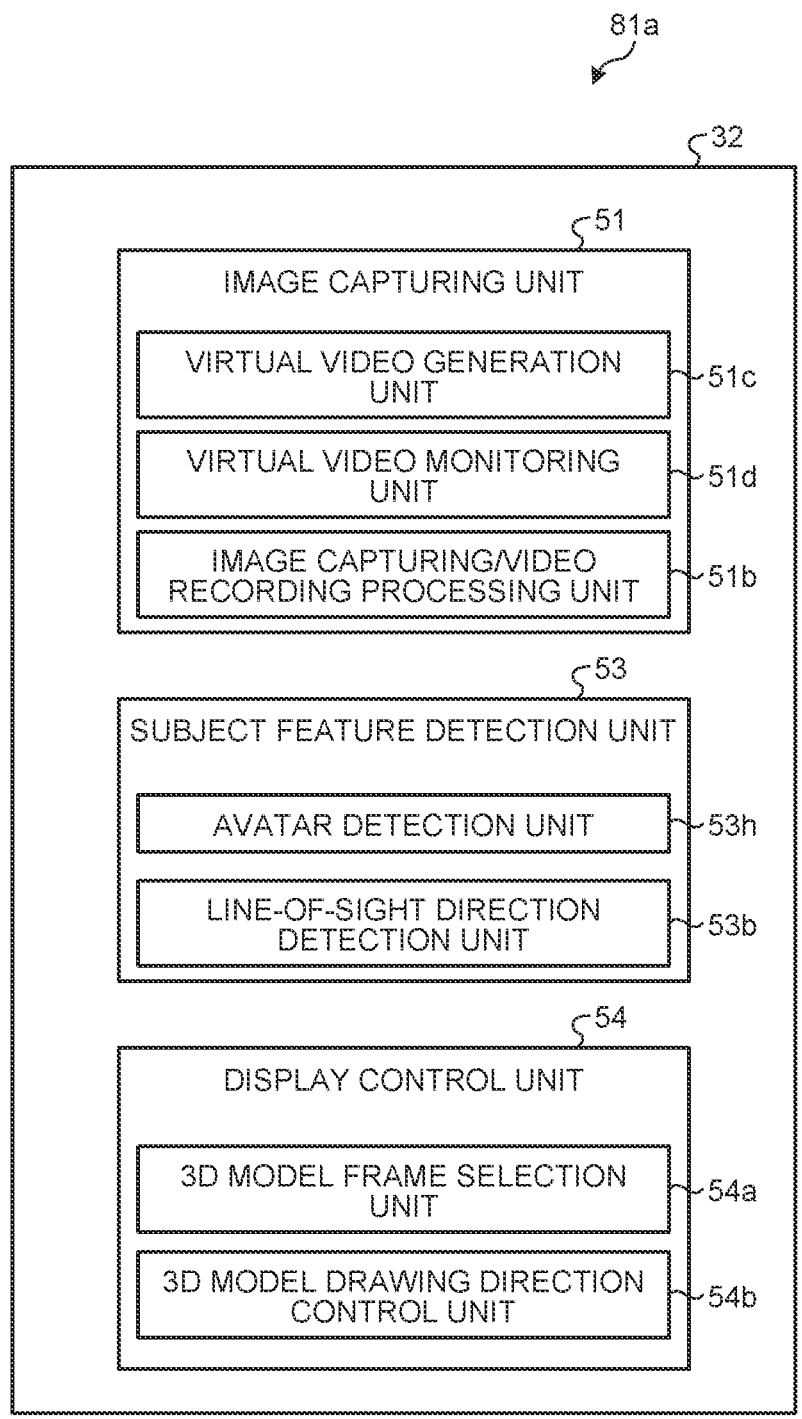
FIG. 23 is a functional block diagram illustrating an example of a functional configuration of the information processing device according to the eighth embodiment.

FIG. 23 is a functional block diagram illustrating an example of a functional configuration of the information processing device according to the eighth embodiment. The information processing device 81a of the eighth embodiment includes an image capturing unit 51, a subject feature detection unit 53, and a display control unit 54. Further, the information processing device 81a performs processing of generating the avatar 92a of the subject 92 in full CG. However, description thereof will be omitted because the processing of generating the avatar 92a may be performed according to a known method.

In response to an operation instruction from the subject 92, the image capturing unit 51 monitors a video, captures an image, and records a video by using the virtual camera 84V operated by the avatar 92a of the subject 92. The image capturing unit 51 includes a virtual video generation unit 51c, a virtual video monitoring unit 51d, a virtual camera video generation unit 51e, and an image capturing/video recording processing unit 51b.

The virtual video generation unit 51c generates the captured image Ia (virtual image) captured by the virtual camera 84V.

The virtual video monitoring unit 51d performs so-called live view in which the captured image Ia is displayed on the head mounted display 89 in real time.

The image capturing/video recording processing unit 51b stores the captured image Ia captured by the virtual camera 84V. Further, the image capturing/video recording processing unit 51b takes a selfie.

The subject feature detection unit 53 detects the avatar 92a of the subject 92 from the captured image Ia captured by the virtual camera 84V. The subject feature detection unit 53 includes an avatar detection unit 53h and a line-of-sight direction detection unit 53b.

The avatar detection unit 53h detects the avatar 92a from the captured image Ia captured by the virtual camera 84V.

The line-of-sight direction detection unit 53b detects the line-of-sight direction E of the avatar 92a detected by the avatar detection unit 53h.

The display control unit 54 changes the display mode of the 3D model 90M in accordance with the line-of-sight direction E of the avatar 92a detected by the subject feature detection unit 53. Specifically, in a case where the line-of-sight direction E of the avatar 92a faces the virtual camera 84V, that is, in a case where the avatar 92a looks at the virtual camera, the display control unit 54 changes the line-of-sight direction F of the 3D model 90M to face the virtual camera 84V. The display control unit 54 includes a 3D model frame selection unit 54a and a 3D model drawing direction control unit 54b. The display control unit 54 is an example of the control unit in the present disclosure.

The 3D model frame selection unit 54a selects a predetermined 3D model 90M from the plurality of 3D models M stored in the storage unit 38. The 3D model frame selection unit 54a further selects the 3D model 90M having the line-of-sight direction F corresponding to the line-of-sight direction E of the avatar 92a detected by the line-of-sight direction detection unit 53b. More specifically, in a case where the avatar 92a looks at the virtual camera, the 3D model frame selection unit 54a selects the 3D model 90M whose line-of-sight direction F faces the virtual camera 84V.

The 3D model drawing direction control unit 54b displays the 3D model 90M selected by the 3D model frame selection unit 54a while superimposing the 3D model 90M on the captured image Ia. The 3D model drawing direction control unit 54b rotates the 3D model 90M to change the direction of the 3D model 90M, thereby generating the 3D model 90N. The 3D model drawing direction control unit 54b displays the 3D model 90N whose direction has been changed while superimposing the 3D model 90N on the captured image Ia.

8-3. Flow of Processing Performed by Information Processing Device

Figure 24:
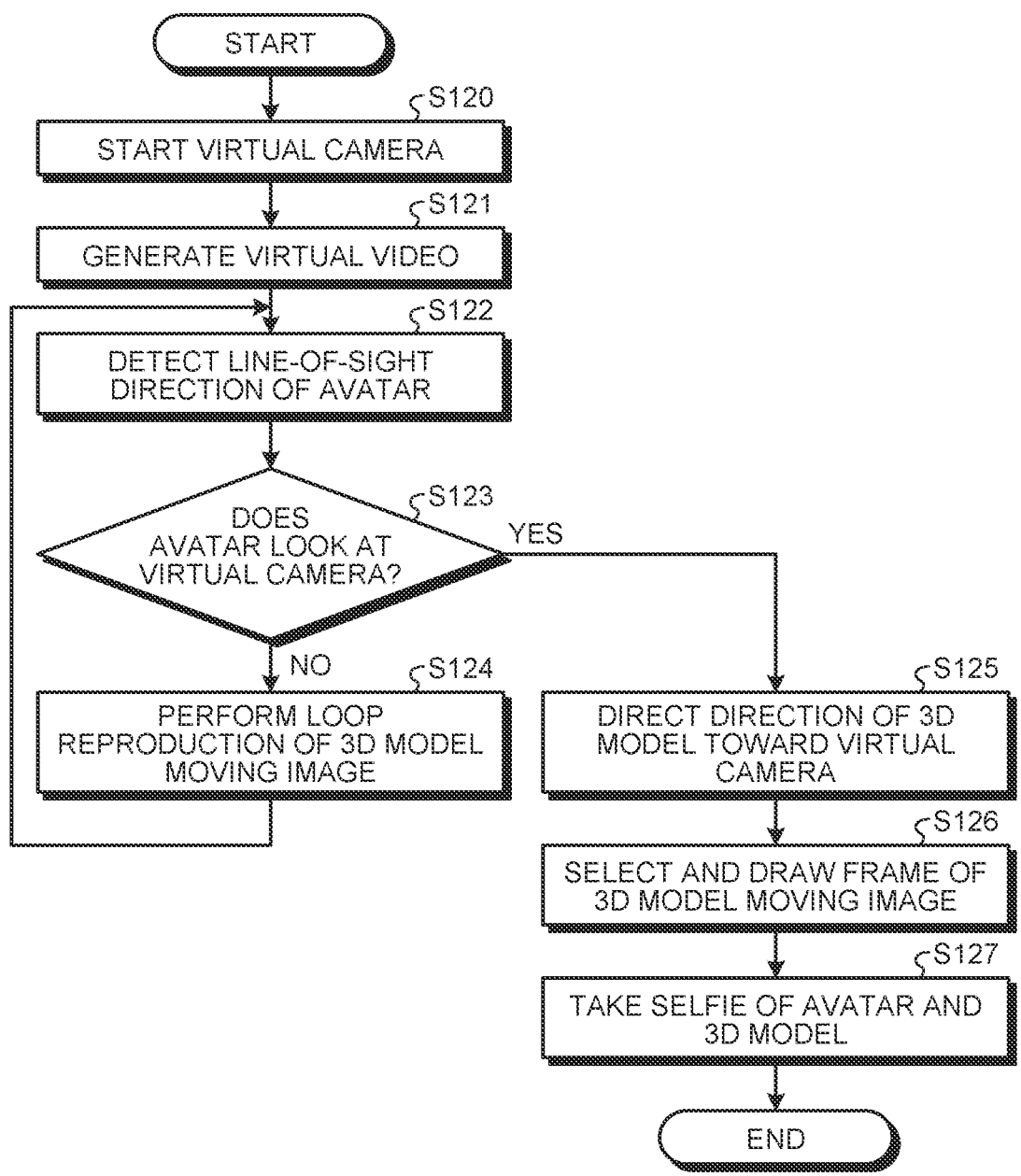
FIG. 24 is a flowchart illustrating an example of a flow of processing performed by the information processing device according to the eighth embodiment.

FIG. 24 is a flowchart illustrating an example of a flow of processing performed by the information processing device according to the eighth embodiment. Hereinafter, the flow of the processing will be described in order.

In response to an operation instruction from the controller 88 by the subject 92, the virtual video monitoring unit 51d starts the virtual camera 84V (step S120).

The virtual video generation unit 51c generates the captured image Ia (virtual image) viewed from the virtual camera 84V (step S121).

The avatar detection unit 53h detects the avatar 92a from the captured image Ia. Then, the line-of-sight direction detection unit 53b detects the line-of-sight direction E of the detected avatar 92a (step S122).

Then, the line-of-sight direction detection unit 53b determines whether or not the avatar 92a looks at the virtual camera 84V (step S123). In a case where it is determined that the avatar 92a looks at the virtual camera (step S123: Yes), the process proceeds to step S125. Meanwhile, in a case where it is determined that the avatar 92a does not look at the virtual camera (step S123: No), the process proceeds to step S124.

In a case where the determination result is No in step S123, the 3D model frame selection unit 54a selects a moving image frame of the 3D model 90M from the 3D models M stored in the storage unit 38. Then, the 3D model drawing direction control unit 54b draws the 3D model 90M selected by the 3D model frame selection unit 54a at a predetermined position in the captured image Ia and performs loop reproduction of the moving image frame (step S124). Thereafter, the process returns to step S122.

Meanwhile, in a case where the determination result is Yes in step S123, the 3D model drawing direction control unit 54b draws the 3D model 90M at the predetermined position in the captured image Ia, and directs the direction of the 3D model 90M toward the virtual camera 84V (step S125).

Next, the 3D model drawing direction control unit 54b draws the 3D model 90N whose eyes are opened and line-of-sight direction faces the virtual camera 84V, which is selected by the 3D model frame selection unit 54a, at the drawing position set in step S125 (step S126). That is, a captured image Ib (virtual image) illustrated in FIG. 22 is generated.

Then, the image capturing/video recording processing unit 51b takes a selfie while both the avatar 92a and the 3D model 90N are looking at the virtual camera (step S127).

8-4. Effects of Eighth Embodiment

As described above, according to the information processing device 81a of the eighth embodiment, the subject feature detection unit 53 (detection unit) detects the line-of-sight direction E (feature) of the avatar 92a (first avatar). The avatar 92a exists in the same virtual space as the 3D model 90M that is displayed in the captured image Ia captured by the virtual camera 84V (second image capturing unit) existing in the virtual space, and moves in the virtual space in response to an operation from the subject 92 (user). Then, the display control unit 54 (control unit) changes the display mode of the 3D model 90M in accordance with the detected line-of-sight direction E of the avatar 92a.

Therefore, it is possible to cause the 3D model 90M, which is displayed in the captured image Ia including the avatar 92a (first avatar) that is the virtual self of the subject 92, to perform an interactive motion or reaction.

9. Ninth Embodiment

A ninth embodiment of the present disclosure is an example of an information processing device having a function of displaying an avatar (second avatar) of a subject different from the subject 92 while superimposing the avatar on the captured image Ia (virtual image), instead of displaying the 3D model 90M while superimposing the 3D model 90M on the captured image Ia (virtual image) in the eighth embodiment.

9-1. Overview of Information Processing Device

FIG. 25 illustrates an overview of the information processing device according to the ninth embodiment.

An information processing device 81b includes not only a camera 84a having the function described in the eighth embodiment but also a camera 84b having the same function as the camera 84a. The camera 84b captures an image of a subject 93 different from the subject 92. In FIG. 25, the subjects 92 and 93 stand side by side, but the subjects 92 and 93 may exist at distant positions. That is, the cameras 84a and 84b may exist at positions distant from each other, and may have a function of wirelessly transmitting a captured image to the information processing device 81b.

The subject 93, as well as the subject 92, wears the head mounted display 89. The head mounted display 89 displays the captured image Ia generated by the information processing device 81b in real time. Note that the head mounted displays 89 worn by the subjects 92 and 93 have a function of outputting not only the captured image Ia but also sound information output by the information processing device 81b. The subject 93 further wears the same controller 88 as the subject 92.

As described in the eighth embodiment, the information processing device 81b generates the captured image Ia (virtual image) in which the avatar 92a (first avatar) of the subject 92 is displayed. The information processing device 81b further displays an avatar 93a (second avatar) of the subject 93 in the captured image Ia. That is, the subjects 92 and 93 are the avatars 92a and 93a, respectively, and exist in the same virtual space of the captured image Ia.

A motion of the subject 92 is detected by the controller 88 and the head mounted display 89 and is transmitted to the information processing device 81b. Then, the motion of the subject 92 is reflected in the captured image Ia as a motion of the avatar 92a. Similarly, a motion of the subject 93 is detected by the controller 88 and the head mounted display 89 and is transmitted to the information processing device 81b. Then, the motion of the subject 93 is reflected in the captured image Ia as a motion of the avatar 93a. As described above, the subjects 92 and 93 freely move around in the captured image Ia as the avatars 92a and 93a, respectively.

The information processing device 81b has a function of allowing the avatar 92a to capture an image in the virtual space by using the virtual camera 84V. That is, when the subject 92 issues an instruction to operate the virtual camera 84V via the controller 88, the avatar 92a takes out the virtual camera 84V and captures an image in such a direction in the virtual space as instructed by the subject 92. The captured image Ia is transmitted by the information processing device 81b to the head mounted displays 89 worn by the subjects 92 and 93. Then, both the subjects 92 and 93 observe the captured image Ia in real time.

The information processing device 81b detects the line-of-sight direction of the avatar 92a and a line-of-sight direction of the avatar 93a appearing in the captured image Ia captured by the virtual camera 84V. When both the avatars 92a and 93a are looking at the virtual camera 84V, the information processing device 81b takes a selfie of the captured image Ib while both the avatars 92a and 93a are looking at the virtual camera 84V in response to an operation instruction from the subject 92.

A hardware configuration of the information processing device 81b is obtained by adding the camera 84b and the controller 88 and head mounted display 89 for the subject 93 to the hardware configuration of the information processing device 81a described in the eighth embodiment.

9-2. Functional Configuration of Information Processing Device

Figure 26:
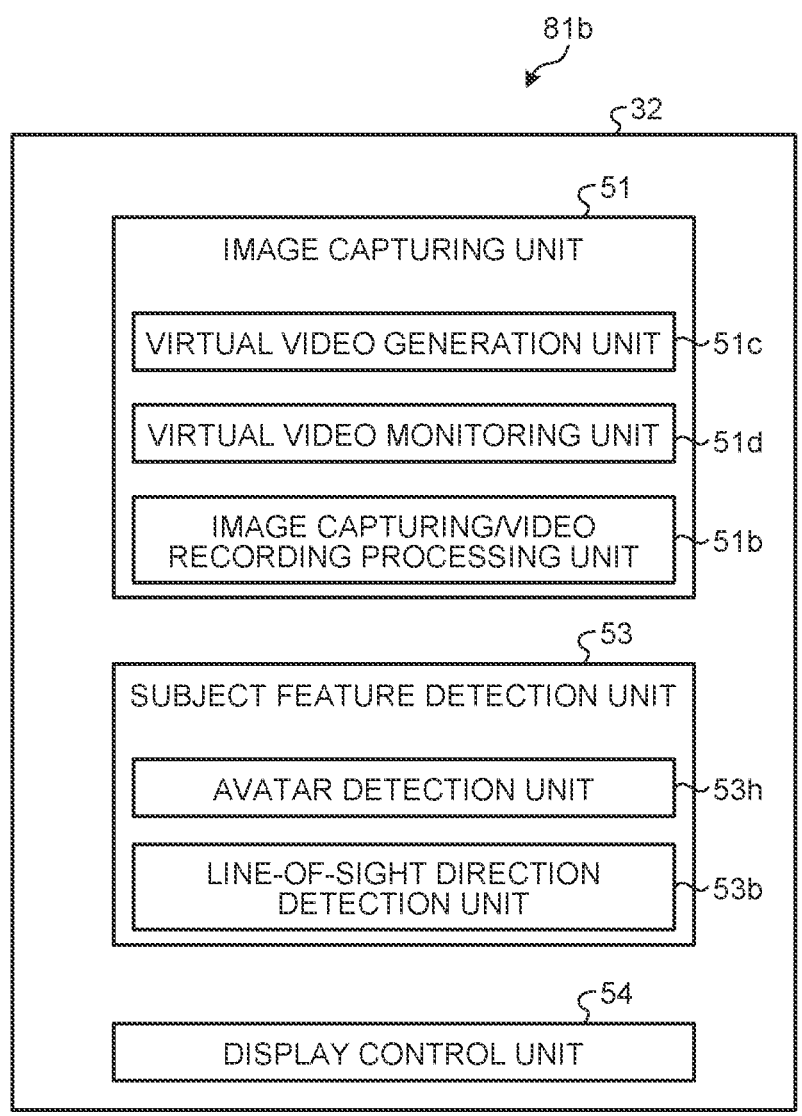
FIG. 26 is a functional block diagram illustrating an example of a functional configuration of the information processing device according to the ninth embodiment.

FIG. 26 is a functional block diagram illustrating an example of a functional configuration of the information processing device according to the ninth embodiment. The information processing device 81b of the ninth embodiment includes an image capturing unit 51, a subject feature detection unit 53, and a display control unit 54.

Description of the image capturing unit 51 will be omitted because the image capturing unit 51 has the same function as that of the eighth embodiment. The subject feature detection unit 53 has the same configuration as the subject feature detection unit 53 described in the eighth embodiment, which includes an avatar detection unit 53h and a line-of-sight direction detection unit 53b. However, this embodiment is different in that the avatar detection unit 53h detects the avatars 92a and 93a from the captured image Ia captured by the virtual camera 84V. The line-of-sight direction detection unit 53b also detects the line-of-sight direction E of the avatar 92a and the line-of-sight direction F of the avatar 93a detected by the avatar detection unit 53h.

The display control unit 54 displays the avatars 92a and 93a while superimposing the avatars 92a and 93a on the captured image Ia.

9-3. Flow of Processing Performed by Information Processing Device

Figure 27:
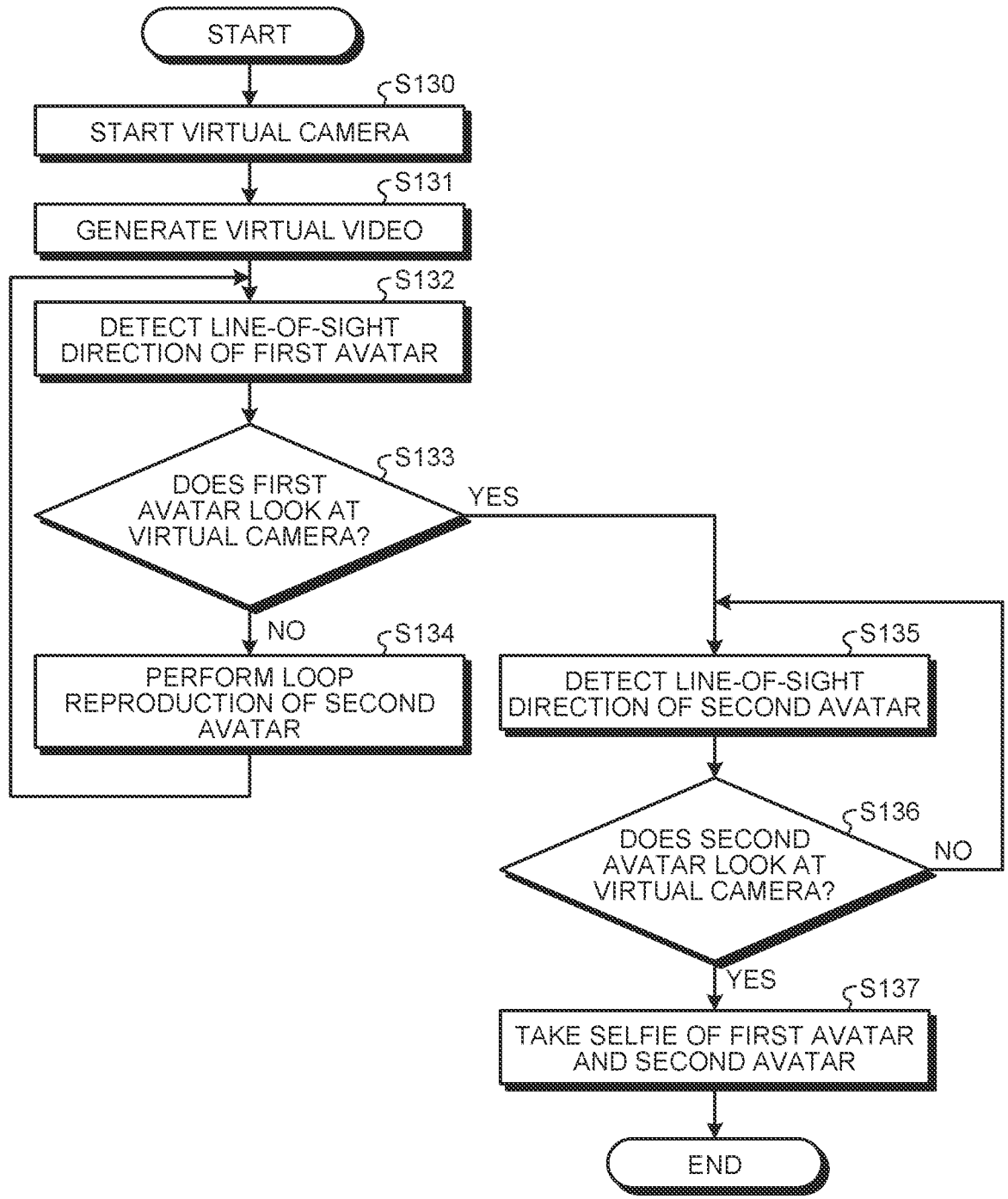
FIG. 27 is a flowchart illustrating an example of a flow of processing performed by the information processing device according to the ninth embodiment.

FIG. 27 is a flowchart illustrating an example of a flow of processing performed by the information processing device according to the ninth embodiment. Hereinafter, the flow of the processing will be described in order.

Description of a flow of processing in steps S130 and S131 will be omitted because the flow is the same as that of the processing in steps S120 and S121 described in the eighth embodiment.

Then, the avatar detection unit 53h detects the avatar 92a (first avatar) from the captured image Ia. Then, the line-of-sight direction detection unit 53b detects the line-of-sight direction E of the detected avatar 92a (step S132).

Then, the line-of-sight direction detection unit 53b determines whether or not the avatar 92a looks at the virtual camera 84V (step S133). In a case where it is determined that the avatar 92a looks at the virtual camera (step S133: Yes), the process proceeds to step S135. Meanwhile, in a case where it is determined that the avatar 92a does not look at the virtual camera (step S133: No), the process proceeds to step S134.

In a case where the determination result is No in step S133, the display control unit 54 performs loop reproduction (live view display) of the avatar 93a in the captured image Ia (step S134). Thereafter, the process returns to step S132.

Meanwhile, in a case where the determination result is Yes in step S133, the avatar detection unit 53h detects the avatar 93a (second avatar) from the captured image Ia. Then, the line-of-sight direction detection unit 53b detects the line-of-sight direction F of the detected avatar 93a (step S135). Note that, in a case where it is determined that the avatar 92a looks at the virtual camera, the information processing device 81b may issue an instruction to "take a picture together" to the subject 93 via the head mounted display 89.

Then, the line-of-sight direction detection unit 53b determines whether or not the avatar 93a looks at the virtual camera 84V (step S136). In a case where it is determined that the avatar 93a looks at the virtual camera (step S136: Yes), the process proceeds to step S137. Meanwhile, in a case where it is determined that the avatar 93a does not look at the virtual camera (step S136: No), the process returns to step S135.

In a case where the determination result is Yes in step S136, the image capturing/video recording processing unit 51b takes a selfie while both the avatars 92a and 93a are looking at the virtual camera (step S137).

9-4. Effects of Ninth Embodiment

As described above, according to the information processing device 81b of the ninth embodiment, the display control unit 54 (control unit) displays the avatar 93a (second avatar) of the subject 93 different from the subject 92 in the captured image Ia.

Therefore, the subject 92 (user) can cause another subject 93 to perform an interactive motion or reaction in the virtual space.

Note that the effects described in the present specification are merely examples and are not limited, and other effects may be exerted. Further, the embodiment of the present disclosure is not limited to the above-described embodiments, and various modifications can be made without departing from the gist of the present disclosure.

For example, the present disclosure can also have the following configurations.

(1)

An information processing device comprising:
a control unit that controls a 3D model displayed in a captured image; and
a detection unit that detects a feature of a subject displayed simultaneously with the 3D model in the captured image, wherein
the control unit changes a display mode of the 3D model in accordance with the feature of the subject detected by the detection unit.

(2)

The information processing device according to (1), wherein:
the detection unit detects a line-of-sight direction serving as the feature of the subject; and
the control unit changes a direction of the 3D model in accordance with the detected line-of-sight direction of the subject.

(3)

The information processing device according to (2), wherein
the control unit changes the direction of the 3D model by rotating the 3D model in accordance with the line-of-sight direction of the subject.

(4)

The information processing device according to (2), wherein
the control unit changes the direction of the 3D model by rotating a coordinate system on which the 3D model is placed in accordance with the line-of-sight direction of the subject.

(5)

The information processing device according to any one of (1) to (4), wherein:
in a case where the detection unit detects that the line-of-sight direction of the subject faces a direction from which the captured image has been captured,
the control unit changes the direction of the 3D model to the direction from which the captured image is captured.

(6)

The information processing device according to any one of (1) to (4), wherein:
in a case where the detection unit detects that the line-of-sight direction of the subject faces the 3D model, the control unit changes the direction of the 3D model to a direction facing the subject.

(7)

The information processing device according to any one of (1) to (6), wherein:
the detection unit detects a facial expression serving as the feature of the subject; and
in a case where it is determined that the facial expression of the subject is a smile, the control unit changes a direction of the 3D model to a direction from which the captured image has been captured.

(8)

The information processing device according to any one of (1) to (7), wherein:
the detection unit detects brightness serving as the feature of the subject; and
the control unit changes brightness of the 3D model in accordance with the brightness of the subject.

(9)

The information processing device according to any one of (1) to (8), wherein:
the detection unit detects a distance from the subject, the distance serving as the feature of the subject; and
the control unit changes a distance from the 3D model so that the 3D model and the subject are located at a depth of field of the captured image.

(10)

The information processing device according to any one of (1) to (9), wherein:
the detection unit detects a position of the subject in the captured image, the position serving as the feature of the subject; and
in a case where the position of the subject and a position of the 3D model are predicted to overlap, the control unit changes a display position of the 3D model to a position that does not overlap with the position of the subject.

(11)

The information processing device according to any one of (1) to (10), wherein:
the detection unit detects a position and size of the subject in the captured image, the position and size serving as the features of the subject; and
the control unit adjusts a display position and size of the 3D model in accordance with the position and size of the subject.

(12)

The information processing device according to any one of (1) to (11), further comprising
an image capturing unit that captures an image of the subject and the 3D model whose display mode has been changed by the control unit.

(13)

The information processing device according to (12), wherein
the image capturing unit is a camera existing in a real world or a virtual camera existing in a virtual world.

(14)

The information processing device according to any one of (1) to (13), wherein:
the subject is a first avatar that exists in the same virtual space as the 3D model and moves in the virtual space based on an operation from a user; and
the detection unit detects a feature of the first avatar displayed in a captured image captured by a second image capturing unit existing in the virtual space.

(15)
The information processing device according to (14), wherein
the 3D model is a second avatar that moves in the virtual space based on an operation from a subject different from the subject.
(16)
The information processing device according to any one of (1) to (14), wherein
the 3D model is a model having 3D information regarding an object existing in a real world, the 3D information being generated by using a plurality of viewpoint images of the object captured from different viewpoints.
(17)
The information processing device according to any one of (1) to (13), wherein
in a case where predetermined display is detected in the captured image,
the control unit displays the 3D model while superimposing the 3D model on the captured image.
(18)
An information processing method comprising:
a control process of controlling a 3D model displayed in a captured image; and
a detection process of detecting a feature of a subject displayed simultaneously with the 3D model in the captured image, wherein
the control process changes a display mode of the 3D model in accordance with the feature of the subject detected by the detection process.
(19)
A program for causing a computer to function as:
a control unit that controls a 3D model displayed in a captured image; and
a detection unit that detects a feature of a subject displayed simultaneously with the 3D model in the captured image, wherein
the program causes the control unit to change a display mode of the 3D model in accordance with the feature of the subject detected by the detection unit.

REFERENCE SIGNS LIST

51 IMAGE CAPTURING UNIT
52 AR MARKER DETECTION UNIT
53 SUBJECT FEATURE DETECTION UNIT (DETECTION UNIT)
54 DISPLAY CONTROL UNIT (CONTROL UNIT)
80 MOBILE TERMINAL (INFORMATION PROCESSING DEVICE)
81a, 81b INFORMATION PROCESSING DEVICE
82 DISPLAY SCREEN
84, 84a, 84b CAMERA (FIRST IMAGE CAPTURING UNIT)
84V VIRTUAL CAMERA (SECOND IMAGE CAPTURING UNIT)
85 AR MARKER (PREDETERMINED DISPLAY)
90 SUBJECT (OBJECT)
90M, 90N, M 3D MODEL
92 SUBJECT (USER)
92a AVATAR (FIRST AVATAR)
93 SUBJECT
93a AVATAR (SECOND AVATAR)
Ia, Ib CAPTURED IMAGE (VIRTUAL IMAGE)
E, F LINE-OF-SIGHT DIRECTION
I CAPTURED IMAGE

The invention claimed is:
1. An information processing device comprising:
a control unit configured to control a 3D model placed in a three-dimensional space and displayed in a captured image; and
a detection unit configured to detect information of a line of sight of a subject displayed simultaneously with the 3D model in the captured image,
wherein the control unit is further configured to change a display mode of the 3D model in accordance with the information of the line of sight of the subject detected by the detection unit so that a direction corresponding to a line of sight of the 3D model is close to either the information of the line of sight of the subject in a first display mode or a direction from which the captured image has been captured in a second display mode,
wherein the control unit changes the display mode of the 3D model between the first display mode and the second display mode based on a degree to which the detected line of the sight of the subject is in the direction from which the captured image has been captured, and
wherein the control unit and the detection unit are each implemented via at least one processor.
2. The information processing device according to claim 1, wherein
the control unit changes a direction of the 3D model in accordance with the detected information of the line of sight of the subject.
3. The information processing device according to claim 2, wherein
the control unit changes the direction of the 3D model by rotating the 3D model in accordance with the information of the line of sight of the subject.
4. The information processing device according to claim 2, wherein
the control unit changes the direction of the 3D model by rotating a coordinate system on which the 3D model is placed in accordance with the information of the line of sight of the subject.
5. The information processing device according to claim 2, wherein
in a case where the detection unit detects that the information of the line of sight of the subject faces the direction from which the captured image has been captured,
the control unit changes the direction of the 3D model to the direction from which the captured image has been captured.
6. The information processing device according to claim 2, wherein
in a case where the detection unit detects that the information of the line of sight of the subject faces the 3D model,
the control unit changes the direction of the 3D model to a direction facing the subject.
7. The information processing device according to claim 1, wherein
the detection unit detects a facial expression serving as a feature of the subject, and
in a case where it is determined that the facial expression of the subject is a smile, the control unit changes a direction of the 3D model to a direction from which the captured image has been captured.
8. The information processing device according to claim 1, wherein the detection unit detects brightness serving as a feature of the subject, and the control unit changes brightness of the 3D model in accordance with the brightness of the subject.

9. The information processing device according to claim 1, wherein the detection unit detects a distance from the subject, the distance serving as a feature of the subject, and the control unit changes a distance from the 3D model so that the 3D model and the subject are located at a depth of field of the captured image.

10. The information processing device according to claim 1, wherein the detection unit detects a position of the subject in the captured image, the position serving as a feature of the subject, and in a case where the position of the subject and a position of the 3D model are predicted to overlap, the control unit changes a display position of the 3D model to a position that does not overlap with the position of the subject.

11. The information processing device according to claim 1, wherein the detection unit detects a position and size of the subject in the captured image, the position and size serving as features of the subject, and the control unit adjusts a display position and size of the 3D model in accordance with the position and size of the subject.

12. The information processing device according to claim 1, further comprising:

an image capturing unit configured to capture an image of the subject and the 3D model whose display mode has been changed by the control unit, wherein the image capturing unit includes at least one camera.

13. The information processing device according to claim 12, wherein the at least one camera exists in a real world or a virtual camera existing in a virtual world.

14. The information processing device according to claim 1, wherein the subject is a first avatar that exists in the same virtual space as the 3D model and moves in the virtual space based on an operation from a user, and the detection unit detects a feature of the first avatar displayed in a captured image captured by a second image capturing unit existing in the virtual space.

15. The information processing device according to claim 14, wherein the 3D model is a second avatar that moves in the virtual space based on an operation from a subject different from the subject.

16. The information processing device according to claim 1, wherein the 3D model is a model having 3D information regarding an object existing in a real world, the 3D information being generated by using a plurality of viewpoint images of the object captured from different viewpoints.

17. The information processing device according to claim 16, wherein in a case where predetermined display is detected in the captured image, the control unit displays the 3D model while superimposing the 3D model on the captured image.

18. An information processing method comprising:

controlling a 3D model placed in a three-dimensional space and displayed in a captured image;

a detection process of detecting information of a line of sight of a subject displayed simultaneously with the 3D model in the captured image; and changing a display mode of the 3D model in accordance with the information of the line of sight of the subject detected by the detection process so that a direction corresponding to a line of sight of the 3D model is close to either the information of the line of sight of the subject in a first display mode or a direction from which the captured image has been captured in a second display mode, wherein the control unit changes the display mode of the 3D model between the first display mode and the second display mode based on a degree to which the detected line of the sight of the subject is in the direction from which the captured image has been captured.

19. A non-transitory computer-readable storage medium having embodied thereon a program, which when executed by a computer causes the computer to execute a method, the method comprising:

controlling a 3D model placed in a three-dimensional space and displayed in a captured image;

detecting information of a line of sight of a subject displayed simultaneously with the 3D model in the captured image; and changing a display mode of the 3D model in accordance with the detected information of the line of sight of the subject so that a direction corresponding to a line of sight of the 3D model is close to either the information of the line of sight of the subject in a first display mode or a direction from which the captured image has been captured in a second display mode, wherein the control unit changes the display mode of the 3D model between the first display mode and the second display mode based on a degree to which the detected line of the sight of the subject is in the direction from which the captured image has been captured.

* * * * *